United States Patent
Takeda et al.

(10) Patent No.: US 10,363,521 B2
(45) Date of Patent: Jul. 30, 2019

(54) FILTER DEVICE, CONTROL VALVE COMPRISING THE FILTER DEVICE, AND FUEL CELL SYSTEM

(75) Inventors: Tsuyoshi Takeda, Hanno (JP); Kazuhiko Osawa, Tokyo (JP); Daisaku Inamura, Iruma (JP); Ichiro Okawara, Hanno (JP); Takatada Usami, Fujisawa (JP); Shinichiro Takemoto, Yokohama (JP)

(73) Assignee: KABUSHIKI KAISHA SAGINOMIYA SEISAKUSHO, Yokohama-shi, Kanagawa (JP)

( * ) Notice: Subject to any disclaimer, the term of this patent is extended or adjusted under 35 U.S.C. 154(b) by 729 days.

(21) Appl. No.: 14/343,507

(22) PCT Filed: Aug. 30, 2012

(86) PCT No.: PCT/JP2012/071942
§ 371 (c)(1),
(2), (4) Date: Apr. 22, 2014

(87) PCT Pub. No.: WO2013/035609
PCT Pub. Date: Mar. 14, 2013

(65) Prior Publication Data
US 2014/0220462 A1 Aug. 7, 2014

(30) Foreign Application Priority Data
Sep. 8, 2011 (JP) .................................. 2011-196103

(51) Int. Cl.
*H01M 8/06* (2016.01)
*B01D 53/26* (2006.01)
(Continued)

(52) U.S. Cl.
CPC ........... *B01D 53/268* (2013.01); *B01D 46/42* (2013.01); *H01M 8/04164* (2013.01); *H01M 8/0662* (2013.01); *H01M 8/0687* (2013.01)

(58) Field of Classification Search
CPC ... B01D 6/42; B01D 53/268; H01M 8/04164; H01M 8/0662; H01M 8/0687
(Continued)

(56) References Cited

U.S. PATENT DOCUMENTS 5,525,214 A * 6/1996 Hembree ............. B01D 24/008
210/100
2009/0162730 A1 6/2009 Ohira et al.
(Continued)

FOREIGN PATENT DOCUMENTS

EP 2528149 A1 11/2012
EP 2549576 A1 1/2013
(Continued)

OTHER PUBLICATIONS

Extended European Search Report dated Jun. 11, 2015 in corresponding EP application No. 12830260, 16 pages.
(Continued)

*Primary Examiner* — Cynthia H Kelly
*Assistant Examiner* — Rashid A Alam
(74) *Attorney, Agent, or Firm* — Snyder, Clark, Lesch & Chung, LLP

(57) ABSTRACT

[Problem]
The object of the invention is to provide the filter device disposed in the moist fluid passage of the fuel cell system in that, water is not adhered and never remains in the filter and when leaving it under the low temperature after the system stops, blockage by freezing the filter can surely be prevented, and the complex control and the heat source such as heaters for the decompression as conventional is unnecessary, and the filter device is cheap and compact.
(Continued)

[Resolution Approach]
A filter device 50 disposed on a moist fluid passage of a system including moisture in the fluid, the filter device comprising:
    a fluid introducing path 58 in which fluid that flows on the moist fluid passage is introduced into a filter room 60 from below filter room 60,
    a filter member 66 in which the fluid introduced from the fluid introducing path 58 into a filter room 60 is permeated and the foreign matter in the fluid is removed,
    a filter 62 placed in the filter room 60,
    a water pooling portion 72 disposed under the filter 62, and
    a fluid discharge path 70 in which the fluid that passed the filter 62 is discharged.

20 Claims, 16 Drawing Sheets

(51) Int. Cl.
    *B01D 46/42*      (2006.01)
    *H01M 8/0662*      (2016.01)
    *H01M 8/04119*      (2016.01)

(58) Field of Classification Search
    USPC .......................................................... 429/410
    See application file for complete search history.

(56) References Cited

U.S. PATENT DOCUMENTS

| | | |
|---|---|---|
| 2010/0071781 A1 | 3/2010 | Hatta |
| 2012/0285131 A1* | 11/2012 | Osawa ............. H01M 8/04097 55/300 |

FOREIGN PATENT DOCUMENTS

| | | |
|---|---|---|
| JP | 07-051526 A | 2/1995 |
| JP | 2004-223397 A | 8/2004 |
| JP | 2005-344873 A | 12/2005 |
| JP | 2007323819 A | 12/2007 |
| JP | 2008-270151 A | 11/2008 |
| WO | 2011089821 A1 | 7/2011 |

OTHER PUBLICATIONS

International Search Report dated Oct. 2, 2012, in corresponding PCT application No. PCT/JP2012/071942, 3 pages.
International Preliminary Report on Patentability dated Aug. 2, 2013, in corresponding PCT application No. PCT/JP2012/071942, 3 pages.
Report by International Search Authority dated Oct. 2, 2012, in corresponding PCT application No. PCT/JP2012/071942, 4 pages.
Report by Preliminary Exam Authority dated May 28, 2013, in corresponding PCT application No. PCT/JP2012/071942, 7 pages.

* cited by examiner

When the water level of the water pooling portion is proper

When the water level of the water pooling portion is improper

FILTER DEVICE, CONTROL VALVE COMPRISING THE FILTER DEVICE, AND FUEL CELL SYSTEM

TECHNICAL FIELD

The invention relates to a filter device disposed in the moist fluid passage of the fuel cell system.

In particular, the invention relates to the filter device which is disposed in series with the upstream side of the purge valve that opens and shuts the passage of the moist fluid, and the invention relates to a suitable filter device as a filter to remove the foreign substance in the fluid.

The invention also relates to a control valve comprising the filter device and a fuel cell system.

BACKGROUND ART

Conventionally, environmental problems in global such as a global warming are recognized.

In place of a car that used fossil fuel such as gasoline that exhaust carbon dioxide which causes global warming, recently, such as an electric vehicle that uses the fuel cell are noted.

As for such a fuel cell system, the fuel cell system that shows in outline in FIG. 16 is adopted.

That is, fuel cell system 200 of FIG. 16 comprises fuel cell stack 202 that is the main body of the solid polymer type fuel cell.

In this fuel cell stack 202, an anode 206 (hydrogen pole), in which the hydrogen gas that is the fuel gas is supplied by hydrogen tank 204 that is the fuel gas supply source, is provided. Moreover, in the fuel cell stack 202, a cathode (air pole) 210, in which an air that is the oxidant gas is supplied through compressor 208, is provided.

As for the hydrogen gas that is the fuel gas, is stock as a high-pressure hydrogen gas in a hydrogen tank 204.

The high-pressure hydrogen gas supplied by hydrogen tank 204 is decompressed to the driving pressure of the fuel cell by a hydrogen pressure adjustment valve 212.

The high-pressure hydrogen gas is supplied to the anode 206 through a hydrogen supply passage 214.

The surplus hydrogen gas, which is not consumed by the anode 206, is returned to the hydrogen supply passage 214 by a hydrogen circulation passage 218 through a hydrogen circulation pump 216.

The surplus hydrogen gas is mixed with the hydrogen gas which is supplied by the hydrogen tank 204, and it is supplied to the anode 206.

On the other hand, air as the oxidant gas is compressed through a compressor 208 through the air filter not shown in the drawing, and the compressed air is supplied to the cathode 210 through an air supply passage 220.

In addition, the atmospheric oxygen is used to react by the cathode 210, and the air of the remainder is discharged through an air pressure adjustment valve 222 that adjusts the air pressure.

Moreover, in the fuel cell stack 202, in order to keep the temperature of the fuel cell stack 202 at the predetermined temperature, the cooling system, in which that he cooling fluid such as cooling water is circulated around, is provided.

That is, the cooling fluid cooled with radiator 224 is circulated to cool the fuel cell stack 202 through a cooling water circulation path 228, 230 by a cooling water pump 226.

Moreover, in the hydrogen circulation passage 218, a discharge path 232 is diverged to exhaust outside the nitrogen gas and the like included in the surplus hydrogen gas.

For instance, a purge valve 234 for opening and shutting of this discharge path 232 with an electromagnetic valve is disposed.

By the way, in the fluid that flows in the hydrogen circulation passage 218, since impurities such as foreign matter might be contained, the filter is provided in the purge valve 234 in the discharge path 232.

For instance, there is Patent Literature 1 (JP 2008-270151, A) as a fuel cell system that disposes the filter in the purge valve 234 on such discharge path 232.

PRIOR ART REFERENCE

Patent Document

[Patent Document 1]
JP 2008-270151, A

SUMMARY OF INVENTION

Problems to be Solved by the Invention

However, in the fuel cell system that installs such a conventional filter, when hygroscopic moisture such as steam is contained in the fluid, the hygroscopic moisture might condense in the passage and water collect.

In particular, in the filter of the purge valve 234 of the discharge path 232, water adheres easily to the mesh portion.

Therefore, when leaving it under the low temperature after the system stops, the water in the filter freezes and discharge path 232 is blockaded.

Thus, after the filter is blockaded, the system can not be activated if the ice is not melted and the passage is not opened.

Therefore, in the fuel cell system of Patent Literature 1, on the starting of the fuel cell system, in order to avoid the blockage of the passage by freezing of the filter, the rotation number of the hydrogen pump is raised at the suspension of the fuel cell system, so that moisture is blown off with the purge gas.

In addition, in the fuel cell system of Patent Literature 1, the filter comprises the structure as easily be warmed and the heater for the defrosting is disposed.

As a result, blockage by freezing is prevented by warming the filter by using the heater for the defrosting on the starting of the fuel cell system.

However, such fuel cell system of Patent Literature 1, it is necessary to raise the rotation number of the hydrogen pump at the suspension of the fuel cell system.

As a result, complicate control is necessary, and the device will be enlarged because the heater should be disposed.

Moreover, because time is required to transmitting the heat of the heater to the filter by the heater, the time for heating on the starting of the fuel cell system is needed.

Accordingly, there is a problem that the starting time of the fuel cell system is extended.

In view of considering such a current state, the object of the invention is to provide the filter device disposed in the moist fluid passage of the fuel cell system, and the control valve comprising the filter device, and the fuel cell system in that, when water is adhered and is remained in the filter, the complicate control and the heat source such as heaters for the defrosting is unnecessary as conventional.

Moreover, the invention is to provide the filter device, and the control valve, and the fuel cell system in that, the moisture that is adhered and remained in the filter can be discharged, and when leaving the system under the low temperature after the system is stopped, blockage by freezing of the filter can surely be prevented.

Furthermore, the invention is to provide the filter device, and the control valve, and the fuel cell system disposed in the moist fluid passage of the fuel cell system in that, the fuel cell system can be promptly started and it is cheap and compact.

Solution to Problem

The invention was invented to achieve the object and the purpose in the above-mentioned prior art, the filter device of the invention is a filter device disposed on a moist fluid passage of a system including moisture in the fluid, the filter device comprising:

a fluid introducing path in which fluid that flows on the moist fluid passage is introduced into a filter room from below filter room, a filter member in which the fluid introduced from the fluid introducing path into a filter room is permeated and the foreign matter in the fluid is removed, a filter placed in the filter room, a water pooling portion disposed under the filter, and a fluid discharge path in which the fluid that passed the filter is discharged.

When the moist fluid that consists of water and the gas is passed through the filter, a part of water is not passed through the filter member (mesh) of the filter, and is stayed in the filter member of the filter according to surface tension.

Under such a condition, when leaving it under the low temperature, water stayed in the filter member is extended to the entire filter member by surface tension, and the entire passage of the filter member (mesh) is blockaded by freezing.

On the other hand, in the present invention, the water pooling portion disposed under the filter is provided.

As a result, when the water retained in the water pooling portion is increased and the liquid level of the water pooling portion is arrived to the filter member of the filter, the water which is collected in the water pooling portion and the water which is adhered and remained in the filter member are connected.

As a result, water, which is stayed in the filter member by surface tension and gravity, is discharged to the water pooling portion.

Consequently, when the water collected in the water pooling portion is flowed and fallen in the fluid introducing path, the water collected in the water pooling portion is functioned as priming water, so that the moisture which is adhered and remained in the filter member can be discharged.

Therefore, when leaving the system under the low temperature after the system is stopped, blockage by freezing of the filter can surely be prevented.

Moreover, the breakage of the filter by freezing the filter member can be also prevented and the fuel cell system can be promptly started.

In addition, the complicate control and the heat source such as heaters for the defrosting is unnecessary as conventional.

Furthermore, the filter device disposed in the moist fluid passage of the fuel cell system which is cheap and compact can be provided.

Moreover, the filter device of the invention is characterized in that, a gap size J1 between the filter and the sidewall of the filter room is composed to be a predetermined size, so that surface tension that operates to the water collected in the water pooling portion is adjusted, whereby the water level of the water pooling portion becomes a predetermined water level.

That is, the gap size J1 between the filter and the sidewall 60a of the filter room is composed (adjusted) to be a predetermined size.

As a result, the surface tension that operates to the water collected in the water pooling portion is adjusted, so that it can be controlled for water to flow and fall to the fluid introducing path.

Consequently, the water level of the water collected in the water pooling portion can be easily set during the system operation.

Moreover, the filter device of the invention is characterized in that, the bottom surface of the water pooling portion is formed to be located lower than the top surface of the filter member of the filter, the lower surface of the fluid introducing path is formed to be located lower than the bottom surface of the water pooling portion.

By composing like this, the bottom surface of the water pooling portion is formed to be located lower than the top surface of the filter member of the filter.

As a result, the water level of the water collected in the water pooling portion can be decided by the outside diameter of the filter, the inside diameter of the filter room, and the fluid introducing path, such that the water level of the water collected in the water pooling portion is positioned upper than the lower end surface of the filter member of the filter during the system operation.

That is, by adjusting the gap size (i.e. the inside diameter of the filter room) between the filter and the sidewall of the filter room, it can be easily set that the water level of the water collected in the water pooling portion is positioned upper than the lower end surface of the filter member of the filter.

Moreover, under such a condition, the water collected in the water pooling portion and the water which is adhered and remained in the filter member are connected.

Under such a condition, the lower surface of the fluid introducing path is formed to be located lower than the bottom surface of the water pooling portion.

As a result, the water collected in the water pooling portion is easy to flow and fall to the fluid introducing path by gravity.

Moreover, in this case, the water collected in the water pooling portion is functioned as priming water, so that the moisture which is adhered and remained in the filter member can be discharged.

Moreover, the filter device of the invention is characterized in that the inside edge bottom surface of the filter is inclined downward toward outside.

By composing like this, the inside edge bottom surface of the filter is formed to be inclined downward toward outside.

As a result, by the inclination of the inside edge bottom surface of the filter, it is easy for water to be discharged from the inside edge bottom surface of the filter to the outside.

Moreover, as shown in the portion of double hatching of FIG. 7, water level, which is collected between the inside edge bottom surface 64e of filter 62 and the filter member 66, is risen by surface tension of water and the filter member 66.

In this case, the inside edge bottom surface 64e of the filter 62 is upheaved to form the inclination.

As a result, in addition to advance of water level by the surface tension, according to the upheaval of the inside edge bottom surface 64e of this filter 62, the water level is more risen.

As a result, the water level of the water, which is collected between the inside edge bottom surface 64e of the filter 62 and the filter member 66, is risen.

Consequently, the moisture, which is adhered and remained in the filter member 66, can be easy to be discharged from the filter 62 by gravity.

In addition, by freezing of water which is stayed in the filter (i.e. the inside edge bottom surface of the filter), the filter itself can be prevented from being damaged.

Moreover, the filter device of the invention is characterized in that a connecting filter member, which is connected to the water pooling portion, is formed on the bottom of the filter.

By composing like this, the connecting filter member, which is connected to the water pooling portion, is formed on the bottom of the filter.

As a result, when the water level of the water pooling portion is risen, the water, which is stayed in the filter member of the filter, is connected to the water pooling portion through the connecting filter member formed on the bottom of the filter.

Consequently, through the connecting filter member formed on the bottom of the filter, the water which is collected in the water pooling portion and the water which is adhered and remained in the filter member are connected.

As a result, the water, which is stayed in the filter member by surface tension and gravity, is discharged to the water pooling portion through the connecting filter member formed on the bottom of the filter.

Consequently, when the water collected in the water pooling portion is flowed and fallen in the fluid introducing path, the water collected in the water pooling portion is functioned as priming water, so that the moisture which is adhered and remained in the filter member can be discharged through the connecting filter member formed on the bottom of the filter.

Moreover, the filter device of the invention is characterized in that the bottom surface of the water pooling portion is formed to be inclined downward toward outside.

By composing like this, the bottom surface of the water pooling portion is formed to be inclined downward toward outside. As a result, it is easy for the water of the water pooling portion to be discharged to the fluid introducing path by gravity.

Moreover, the filter device of the invention is characterized in that the filter member of the filter is extended to an side surface position, which is lower than the bottom surface of the inside edge of the filter.

By composing like this, the filter member of the filter is extended to an side surface position, which is lower than the bottom surface of the inside edge of the filter.

As a result, even if the water level of the water pooling portion is low, through the extending portion of this filter member, the water which is stay in the filter member of the filter and the water which is collected in the water pooling portion are connected.

As a result, the water, which is stayed in the filter member by surface tension and gravity, is discharged to the water pooling portion through the extending portion of this filter member.

Consequently, when the water collected in the water pooling portion is flowed and fallen in the fluid introducing path, the water collected in the water pooling portion is functioned as priming water, so that the moisture which is adhered and remained in the filter member can be discharged.

Moreover, the filter device of the invention is characterized in that the water pooling portion is formed in the filter room.

By composing like this, the water pooling portion can be formed on the filter housing, in which the filter room is formed by, for instance, the groove processing etc.

As a result, the processing for the forming of the water pooling portion is easy.

Moreover, the filter device of the invention is characterized in that the water pooling portion is formed in the filter.

By composing like this, as the water pooling portion is formed in the filter, the water pooling portion need not be formed on the filter housing, in which the filter room is formed.

As a result, in the filter housing, a special processing of the groove processing etc. is unnecessary, so that the time of the processing can be saved and the cost can be reduced.

In addition, as mentioned above, together with the water pooling portion which is formed in the filter room, the water pooling portion may be formed in such a filter.

Moreover, the filter device of the invention is characterized in that a hydrophilic treatment is applied to the water pooling portion.

By composing like this, the hydrophilic treatment is applied to the water pooling portion.

As a result, the water collected in the water pooling portion does not become spherical, so that it becomes easy to flow.

Consequently, the water collected in the water pooling portion is easy to be flowed and fallen in the fluid introducing path, so that the moisture which is adhered and remained in the filter member can be effectively discharged.

Moreover, the filter device of the invention is characterized in that a hydrophilic treatment is applied to the lower part of the filter member of the filter.

By composing like this, the hydrophilic treatment is applied to the lower part of the filter member of the filter.

As a result, the moisture which is adhered and remained in the filter member is easy to be flowed, so that it can be effectively discharged by function of gravity.

Moreover, the filter device of the invention is characterized in that a water-repellent treatment is applied to the upper portion of the filter member of the filter.

By composing like this, the water-repellent treatment is applied to the upper portion of the filter member of the filter.

As a result, the moisture, which is adhered to the upper portion of the filter member of the filter, is flipped by the water-repellent treatment.

Consequently, it is not remained in the upper portion of the filter member (i.e. the mesh portion).

Therefore, it is drawn to the lower part of the filter member by the function of gravity, so that the moisture which is adhered and remained in the filter member can be effectively discharged.

Moreover, where the hydrophilic treatment is applied to the lower part of the filter member of the filter, the moisture, which is adhered to the upper portion of the filter member of the filter and flipped by the water-repellent treatment, is drawn by the lower part of the filter member of the filter to which the hydrophilic treatment is applied.

Consequently, the moisture which is adhered and remained in the filter member can be effectively discharged.

Moreover, the invention is a control valve wherein the filter device described in any one of the above-mentioned is comprised.

By composing like this, for instance, where the control valve of the invention is used for the purge valve etc. of the discharge path of the fuel cell system, when leaving the system under the low temperature after the system is stopped, blockage by freezing of the filter can surely be prevented.

Moreover, the breakage of the filter by freezing the filter member can be also prevented and the fuel cell system can be promptly started.

Moreover, the control valve of the invention is characterized in that an elastic member is disposed between the filter housing, in which the filter room is composed, and the filter.

By composing like this, the elastic member is disposed between the filter housing, in which the filter room is composed, and the filter.

As a result, the vibration by operation of control valve, i.e. the vibration etc. by abutting and separating the valve element to the valve seat is transmitted to the filter.

Consequently, the filter retained by the elastic member is vibrated, so that the moisture which is adhered and remained in the filter member is easily discharged.

Moreover, the control valve of the invention is characterized in that the valve element and the filter of the control valve are connected.

By composing like this, the valve element and the filter of the control valve are connected.

As a result, the filter is vibrated directly by operating of the control valve, so that the moisture which is adhered and remained in the filter member is more easily discharged.

Moreover, the invention is a fuel cell system wherein the filter device described in any one of the above-mentioned is disposed on the discharge passage of the moist fluid passage of the fuel cell system.

By composing like this, for instance, where the fuel cell system of the invention is used for the purge valve etc. of the discharge path of the fuel cell system, when leaving the system under the low temperature after the system is stopped, blockage by freezing of the filter can surely be prevented.

Moreover, the breakage of the filter by freezing the filter member can be also prevented and the fuel cell system can be promptly started.

Moreover, the invention is a fuel cell system wherein the control valve described in any one of the above-mentioned is disposed on the discharge passage of the moist fluid passage of the fuel cell system.

By composing like this, for instance, where the control valve of the invention is used for the purge valve etc. of the discharge path of the fuel cell system, when leaving the system under the low temperature after the system is stopped, blockage by freezing of the filter can surely be prevented.

Moreover, the breakage of the filter by freezing the filter member can be also prevented and the fuel cell system can be promptly started.

Moreover, because the filter has combined with the control valve, the fuel cell system can be miniaturized.

Advantageous Effects of Invention

According to the invention, the water pooling portion disposed under the filter is provided.

As a result, when the water retained in the water pooling portion is increased and the liquid level of the water pooling portion is arrived to the filter member of the filter, the water which is collected in the water pooling portion and the water which is adhered and remained in the filter member are connected.

As a result, water, which is stayed in the filter member by surface tension and gravity, is discharged to the water pooling portion.

Consequently, when the water collected in the water pooling portion is flowed and fallen in the fluid introducing path, the water collected in the water pooling portion is functioned as priming water, so that the moisture which is adhered and remained in the filter member can be discharged.

Therefore, when leaving the system under the low temperature after the system is stopped, blockage by freezing the filter can surely be prevented.

Moreover, the breakage of the filter by freezing the filter member can be also prevented and the fuel cell system can be promptly started.

In addition, the complicate control and the heat source such as heaters for the defrosting is unnecessary as conventional. Furthermore, the filter device disposed in the moist fluid passage of the fuel cell system which is cheap and compact can be provided.

DESCRIPTION OF EMBODIMENTS

Figure 1:
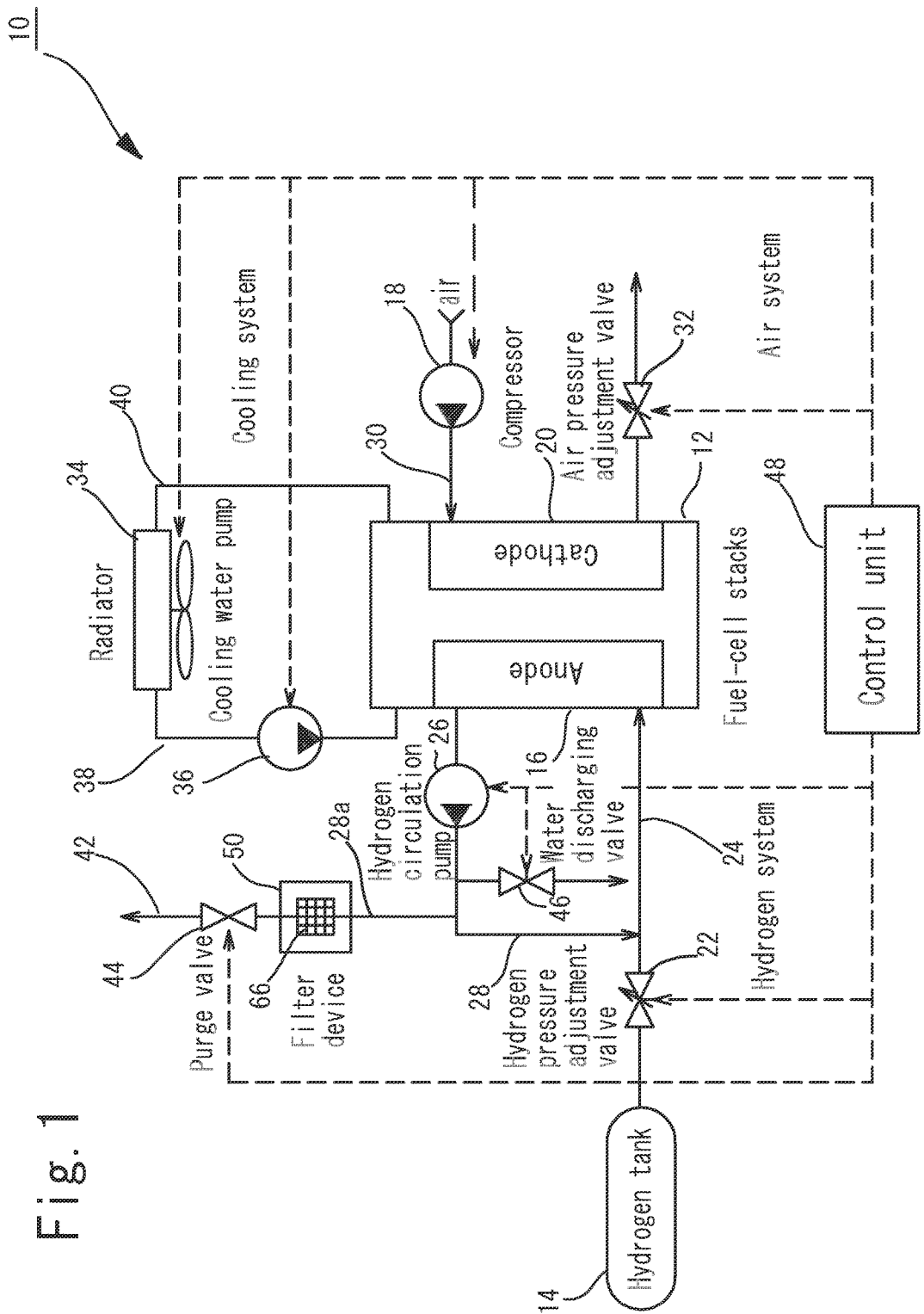
FIG. 1 is a schematic view of the fuel cell system to which the filter device of the invention is applied.

Hereafter, the embodiment of the invention (Embodiment) is described in the detail or more on the basis of the drawing.

Embodiment 1

FIG. 1 is a schematic view of the fuel cell system to which the filter device of the invention is applied.

Figure 2:
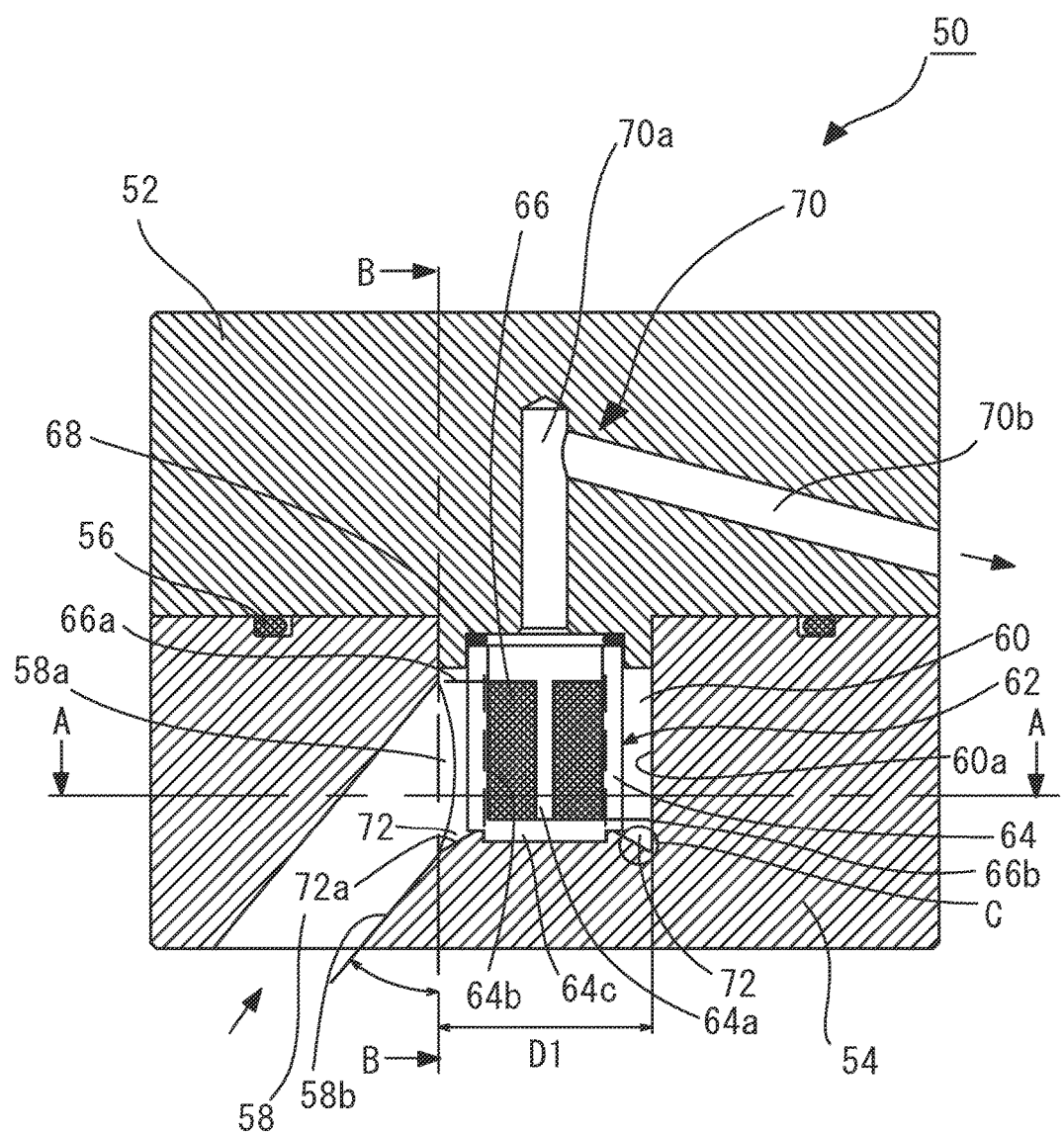
FIG. 2 is a schematic longitudinal sectional view of the Embodiment of the filter device of the invention.

FIG. 2 is a schematic longitudinal sectional view of the Embodiment of the filter device of the invention.

Figure 3:
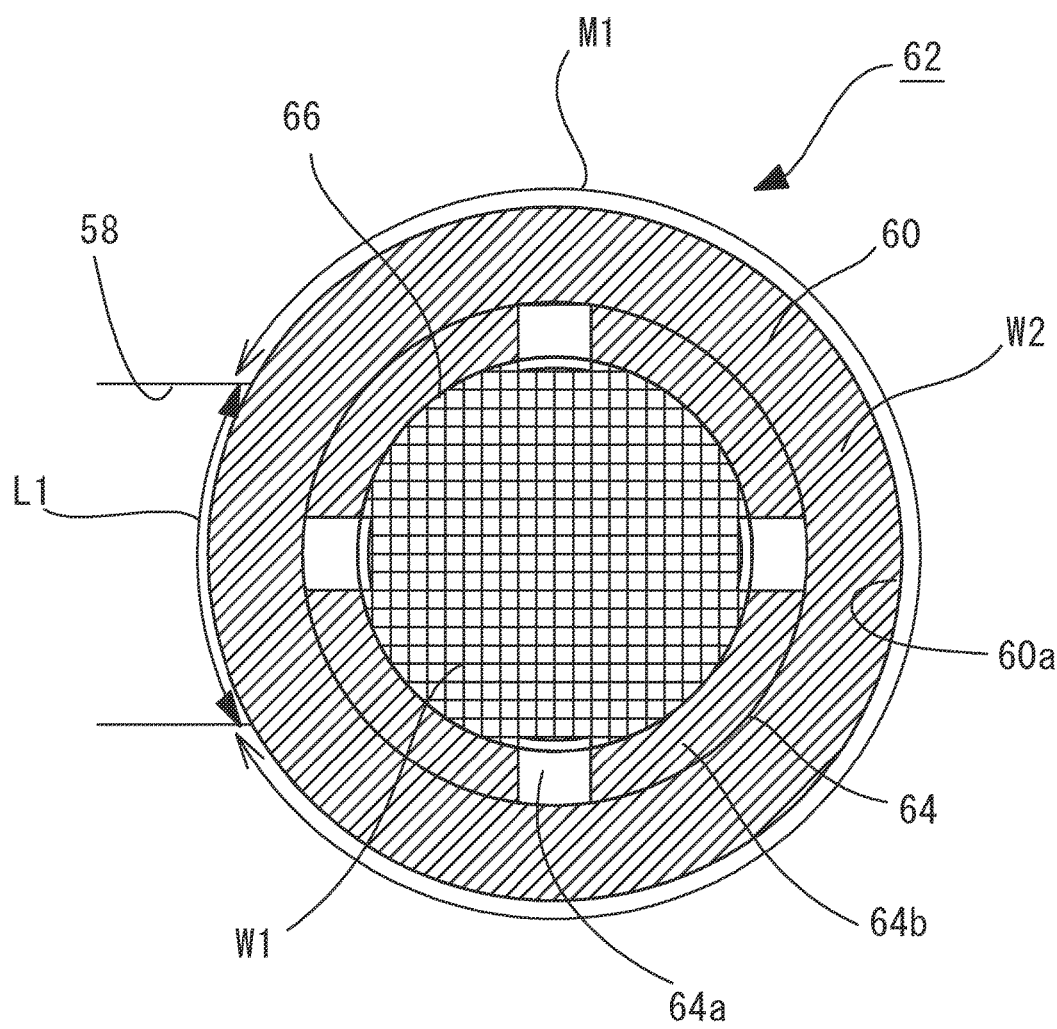
FIG. 3 is a schematic cross-sectional view in the A-A line of the filter device of FIG. 2.

FIG. 3 is a schematic cross-sectional view in the A-A line of the filter device of FIG. 2.

Figure 4:
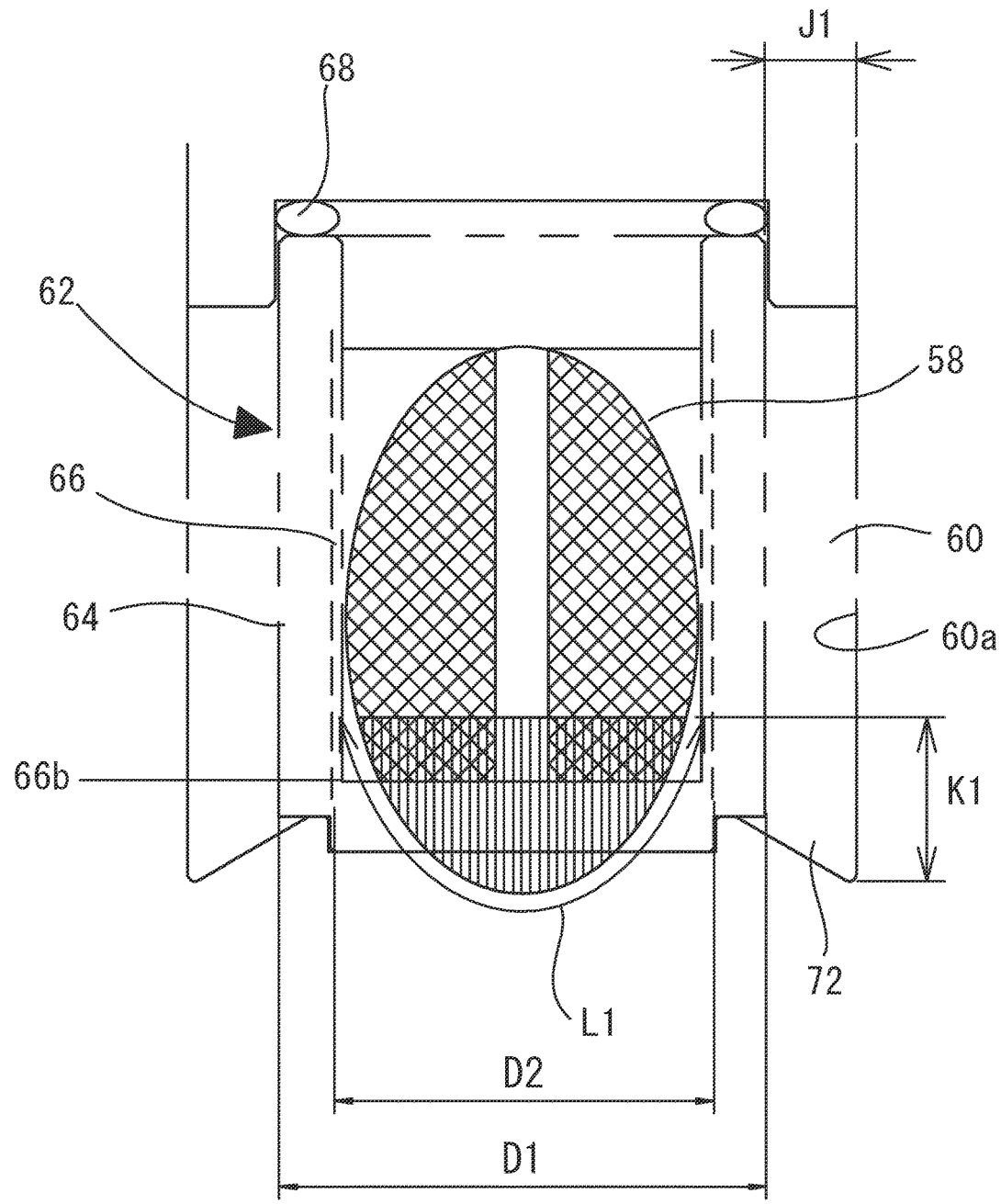
FIG. 4 is a schematic cross-sectional view when the water level of the water pooling portion in the B-B line of the filter device of FIG. 2 is proper.

FIG. 4 is a schematic cross-sectional view when the water level of the water pooling portion in the B-B line of the filter device of FIG. 2 is proper.

Figure 5:
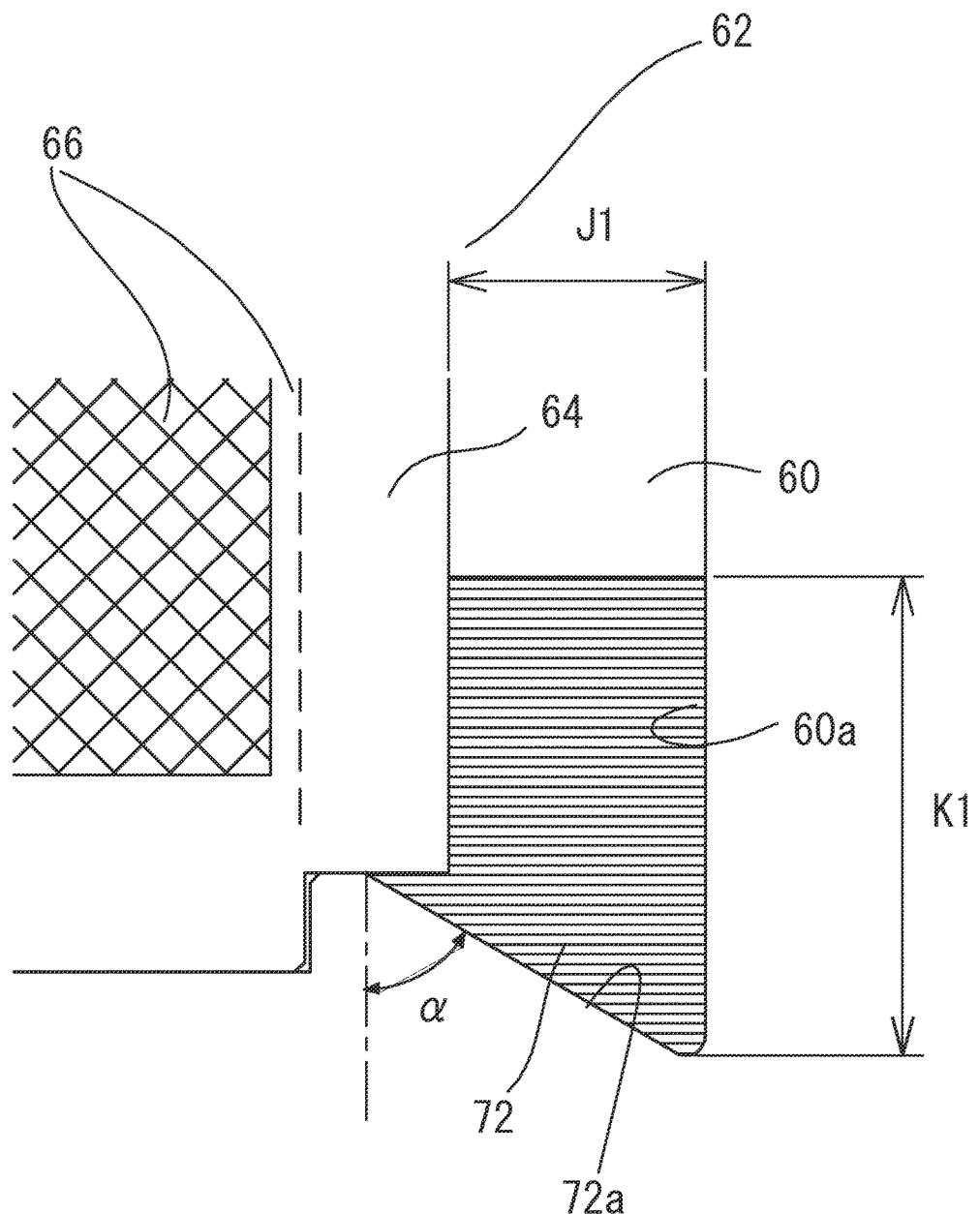
FIG. 5 is a partial enlarged sectional view of C portion of the filter device of FIG. 2.

FIG. 5 is a partial enlarged sectional view of C portion of the filter device of FIG. 2.

Figure 6:
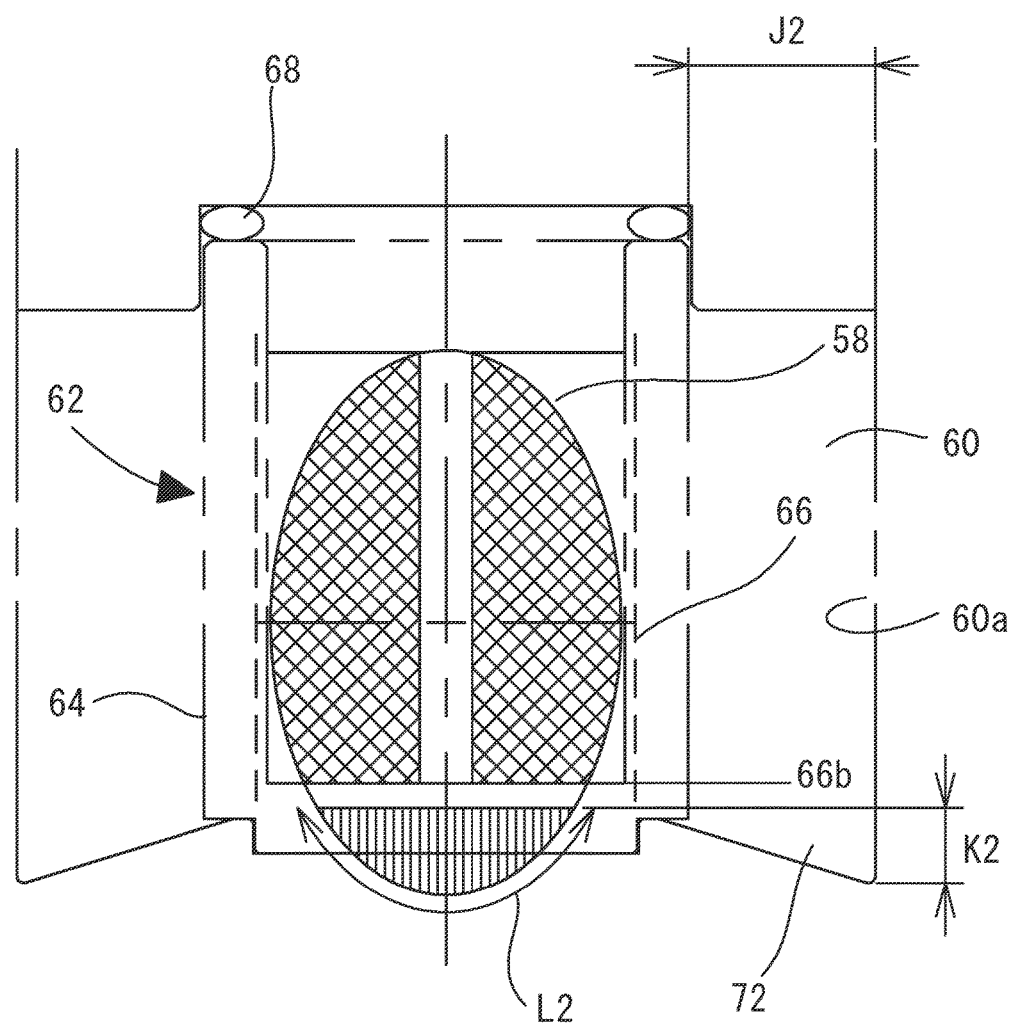
FIG. 6 is a schematic cross-sectional view when the water level of the water pooling portion in the B-B line of the filter device of FIG. 2 is improper.

FIG. 6 is a schematic cross-sectional view when the water level of the water pooling portion in the B-B line of the filter device of FIG. 2 is improper.

Reference numeral 10 shows the fuel cell system to which the filter device of the invention is applied as a whole in FIG. 1.

As shown in FIG. 1, a fuel cell system 10 comprises a fuel cell stack 12 that is the main body of the solid polymer type fuel cell.

In this fuel cell stack 12, an anode 16 (hydrogen pole), in which the hydrogen gas that is the fuel gas is supplied from a hydrogen tank 14 that is the fuel gas supply source, is provided. Moreover, in the fuel cell stack 12, a cathode 20 (air pole), in which air that is the oxidant gas is supplied through a compressor 18, is provided.

The hydrogen gas that is the fuel gas, is reserved in the hydrogen tank 14 as a high-pressure hydrogen gas.

The high-pressure hydrogen gas supplied from the hydrogen tank 14 is decompressed to the driving pressure of the fuel cell with a hydrogen pressure adjustment valve 22 and is supplied to the anode 16 through an hydrogen supply passage 24.

The hydrogen gas of the surplus not consumed by anode 16 is returned to the hydrogen supply passage 24 by a hydrogen circulation passage 28 through a hydrogen circulation pump 26.

As a result, the surplus hydrogen gas is mixed with the hydrogen gas supplied from the hydrogen tank 14 and is supplied to the anode 16.

On the other hand, air as the oxidant gas is compressed through the compressor 18 through the air filter not shown in the drawing and the compressed air is supplied to the cathode 20 through an air supply passage 30.

In addition, the atmospheric oxygen is used to react by the cathode 20, and the air of the remainder is exhausted through an air pressure adjustment valve 32 that adjusts the air pressure.

Moreover, in the fuel cell stack 12, a cooling system that circulates around the cooling fluid such as cooling water is provided in order to keep the temperature of the fuel cell stack 12 at the predetermined temperature.

That is, cooling fluid cooled with a radiator 34 is circulated to cool the fuel cell stack 12 through cooling fluid circulation paths 38 and 40 by a cooling water pump 36.

Moreover, in the hydrogen circulation passage 28, a discharge path 42 to exhaust the hydrogen gas of the surplus outside is diverged.

Moreover, for instance, a purge valve 44 with an electromagnetic valve for opening and shutting this discharge path 42 has been disposed.

In addition, since impurities such as foreign matters might be contained in the fluid that flows in the hydrogen circulation passage 28, a filter device 50 of the invention has been disposed on the upstream side of the purge valve 44 on the discharge path 42.

In the drawing, reference numeral 46 shows a water discharging valve and reference numeral 48 shows a control unit. For instance, this control unit comprises the processor such as CPU.

Based on the various data and program, which are separately memorized in the memory beforehand, the operation of a compressor 18, a hydrogen pressure force pulse valve 22, a hydrogen circulation pump 26, an air pressure adjustment valve 32, a radiator 34, a cooling water pump 36, a purge valve 44, and water the discharging valve 46, etc. is controlled.

The filter device 50 of the invention, as shown in FIG. 2, comprises an upper housing 52 and a lower housing 54.

Between these upper housing 52 and the lower housing 54, the sealing is accomplished by a sealing member 56.

In the lower housing 54, as shown in FIG. 2, a fluid introducing path 58, which is connected to a divergence path 28a of the hydrogen circulation passage 28 and through which the fluid is introduced, is formed.

This fluid introducing path 58 is formed such that it is inclined upwardly from a lower side of the lower housing 54 and is arrived from a lower side of a filter room 60 to the filter room 60.

That is, an upper end 58a of the fluid introducing path 58 is connected to the filter room 60, which is formed on the center of the upper portion of the lower housing 54.

In this filter room 60, as shown in FIG. 2 and FIG. 3, a filter 62, in which the fluid introduced from fluid introducing path 58 is penetrated and, for instance, the foreign matter of garbage etc. in the fluid is removed, is accommodated.

The filter 62, as shown in FIG. 2 and FIG. 3, a filter main body 64 of the substantially cylindrical shape having bottom is provided.

Moreover, a filter member 66 such as the meshes installed in side periphery of the filter main body 64 is provided, so that an opening portion 64b formed between four longitudinal frame members 64a of this filter main body 64 is covered.

In addition, the sealing member 68 is disposed between the filter main body 64 and the upper housing 52.

Moreover, on the filter 62, a fluid discharge path 70, in which the fluid passed through the filter 62 is discharged, is formed in the upper housing 52.

This fluid discharge path 70 is connected with the purge valve 44 of the discharge path 42.

Moreover, this fluid discharge path 70 comprises:
first fluid discharge path 70a that extends upwardly, and
second fluid discharge path 70b which is formed to the side of the upper housing 52 by inclining downwardly.

In addition, as shown in FIG. 2, on the periphery of a bottom 64c of the filter main body 64 under the filter 62, a water pooling portion 72, which has the substantially triangle cross section and the groove shape, is formed on the corner portion of the lower end of the filter room 60 of the lower housing 54.

Thus, the water pooling portion 72 is formed in the filter room 60 of the lower housing 54.

As a result, the water pooling portion 72 can be formed on the lower housing 54, in which the filter room 60 is formed by, for instance, the groove processing etc.

Therefore, the processing for the forming of the water pooling portion is easy.

That is, when the moist fluid that consists of water and the gas is passes through the filter 62, a part of water is not passed through the filter member 66 of the filter 62.

As a result, it is stayed in the filter member 66 of the filter according to surface tension.

Under such a condition, when leaving it under the low temperature, the water which is stayed in the filter member 66 is extended to the whole of the filter member 66 by surface tension. As a result, the entire passage of the filter member 66 (mesh) is blockaded by freezing.

On the other hand, in the present invention, the water pooling portion 72 which is disposed under the filter 62 is provided.

As a result, when the water retained in the water pooling portion 72 is increased and the liquid level of the water pooling portion 72 is arrived to the filter member 66 of the filter 62, the water which is collected in the water pooling portion 72 and the water which is adhered and remained in the filter member 66 are connected.

As a result, water, which is stayed in the filter member 66 by surface tension and gravity, is discharged to the water pooling portion 72.

Consequently, when the water collected in the water pooling portion 72 is flowed and fallen in the fluid introducing path 58, the water collected in the water pooling portion 72 is functioned as priming water, so that the moisture which is adhered and remained in the filter member 66 can be discharged.

In addition, because a bottom surface 72a of the water pooling portion 72 and the fluid introducing path 58 are connected, the water collected in the water pooling portion is discharged to the fluid introducing path 58 at the same time.

Therefore, when leaving the system under the low temperature after the system is stopped, blockage by freezing of the filter 66 can surely be prevented.

Moreover, the breakage of the filter 62 by freezing the filter member 66 can be also prevented and the fuel cell system can be promptly started.

In addition, the complicate control and the heat source such as heaters for the defrosting is unnecessary as conventional. Furthermore, the filter device 50 disposed in the moist fluid passage of the fuel cell system which is cheap and compact can be provided.

In this case, as shown in FIG. 2, it is preferable that the bottom surface 72a of the water pooling portion 72 is formed to be located lower than a top surface 66a of the filter member 66 of the filter 62.

Moreover, it is preferable that a lower surface 58b of the fluid introducing path 58 is formed to be located lower than the bottom surface 72a of the water pooling portion 72.

By composing like this, the bottom surface 72a of the water pooling portion 72 is formed to be located lower than the top surface 66a of the filter member 66 of the filter 62.

As a result, the water level of the water collected in the water pooling portion 72 can be decided by outside diameter of the filter 62, the inside diameter of the filter room 60, and the fluid introducing path 58, such that, during the system operation, the water level of the water collected in the water pooling portion 72 is positioned upper than a lower end surface 66b of the filter member 66 of the filter 62.

That is, a gap size J1 between the filter 62 and the sidewall 60a of the filter room 60 is composed (adjusted) to be a predetermined size.

As a result, the surface tension that operates to the water collected in the water pooling portion 72 may be adjusted, so that it can be controlled for water to flow and fall to the fluid introducing path 58.

Consequently, the water level of the water collected in the water pooling portion 72 can be easily set during the system operation.

Specifically, for instance, as shown in FIG. 3 to FIG. 5, when the water level of the water pooling portion is to be K1, the circumference of the water pooling portion 72 of the fluid introducing path 58 is assumed to be L1, the circumference of the water pooling portion 72 of the inside diameter D1 of the filter room 60 is assumed to be M1, and the surface tension per unit length of water is assumed to be $\gamma$.

As a result, the surface tension of the water that operates to the circumference L1 of the water pooling portion 72 of the fluid introducing path 58 and to the circumference M1 of the water pooling portion 72 of the inside diameter D1 of the filter room 60 is $$F1 = (L1 + M1) \cdot \gamma.$$

Moreover, volume W of minimum water, which is overcome against surface tension F1 of this water and which is flowed and fallen in the fluid introducing path 58 of the tilt angle $\theta$, is obtained by $W = F1/(G \cdot \cos \theta)$ when gravity acceleration is assumed to be G.

As shown in FIG. 3, in this case, W is the sum of volume W1 of the water which is collected in the filter 62 and water W2 which is collected between the filter 62 and the sidewalls 60a of the filter room 60 of the lower housing 54.

That is, it is W=W1+W2.

By the way, W1 is decided by the inside diameter size D2 of the filter 62 and the water level in which the filter 62 is immersed.

Therefore, the gap size J1 between the filter 62 and the sidewall 60a of the filter room 60 of the lower housing 54 may be adjusted and set, such that the water W2, which is collected between the filter 62 and the sidewalls 60a of the filter room 60 of the lower housing 54, is become the desired water level K1.

In this case, if the gap size J1 between the filter 62 and the sidewall 60a of the filter room 60 is enlarged too much (see J2 of FIG. 6), as shown in FIG. 6, the water level of the water pooling portion 72 would not be reached to the desired K1 and would be the water level K2.

As a result, the water level of the water pooling portion 72 is lower than the lower end surface 66b of the filter member 66 of the filter 62.

Consequently, the water of the water pooling portion 72 would not be connected to the water in the mesh of the filter member 66.

Therefore, the moisture which is adhered and remained in the filter member 66 can not be discharged.

Therefore, as mentioned above, the gap size J1 between the filter 62 and the sidewall 60a of the filter room 60 of the lower housing 54 may be adjusted and set, such that the water W2, which is collected between the filter 62 and the sidewalls 60a of the filter room 60 of the lower housing 54, is become the desired water level K1.

In this case, as for the gap size J1 between the filter 62 and the sidewall 60*a* of the filter room 60 of the lower housing 54, it is not limited especially, However, if the above-mentioned surface tension is considered, it is desirable that, where the inside diameter of the fluid introducing path 58 is assumed to be 5-20 mm, it is set within the range of 1-20 mm.

In addition, as the fluid introducing path 58 and the second fluid discharge path 70*b*, the inclination is provided, so that the moisture can be flowed to a lower side of piping.

In this case, it is not especially limited as angle of inclination θ of the fluid introducing path 58.

However, it is desirable that if the above-mentioned discharge effect is considered, it is set within the range of 30° to 60°.

Moreover, as shown in FIG. 2, FIG. 4-FIG. 5, it is desirable that the bottom surface 72*a* of the water pooling portion 72 is formed to be inclined downward toward outside.

By composing like this, the bottom surface 72*a* of the water pooling portion 72 is formed to be inclined downward toward outside.

As a result, it is easy for the water of the water pooling portion 72 to be discharged to the fluid introducing path 58 by gravity.

It is not especially limited as this angle of inclination α.

However, it is desirable that if the above-mentioned discharge effect is considered, it is set within the range of 45° to 75°.

Moreover, in this case, as for a material of the filter member 66 of the filter 62, it is not especially limited.

If the filter function is possessed, the conventionally well-known various materials such as the mesh made of the stainless steel of SUS etc. and the porous filter can be utilized.

Moreover, it is not also especially limited as a material of the filter main body 64 of the filter 62.

It is possible to be composed by the well-known material such as the synthetic resin and metal of stainless SUS, etc.

Moreover, it is desirable that, if the drain function is considered, the filter member 66 comprises the filter member 66 having one layer.

However, of course, it may be multi-layer.

Moreover, in this Embodiment, the filter 62 comprises the filter main body 64 having the substantially cylindrical shape.

However, it can be included various shape such as conical shape, pyramid shape and the polygonal shape, etc.

In addition, it is desirable that the water-repellent treatment is applied to the fluid introducing path 58 and the fluid discharge path 70, since the moisture is easy to flow.

As for such a water-repellent treatment, conventionally well-known water-repellent treatment is available.

For instance, it is desirable that the water-repellent treatment of the fluorine treating by fluororesin such as polytetrafluoroethylene is applied, since the moisture is easy to flow.

Moreover, it is desirable that a hydrophilic treatment is applied to the water pooling portion 72.

By composing like this, the hydrophilic treatment is applied to the water pooling portion.

As a result, the water collected in the water pooling portion 72 does not become spherical, so that it becomes easy to flow. Consequently, the water collected in the water pooling portion 72 is easy to be flowed and fallen in the fluid introducing path 58, so that the moisture which is adhered and remained in the filter member 66 can be effectively discharged.

Moreover, it is desirable that a hydrophilic treatment is applied to the lower part of the filter member 66 of the filter 62.

By composing like this, the hydrophilic treatment is applied to the lower part of the filter member 66 of the filter 62.

As a result, the moisture which is adhered and remained in the filter member 66 is easy to be flowed, so that it can be effectively discharged by function of gravity.

In this case, as for the hydrophilic treatment, it is not especially limited and the conventionally well-known hydrophilic treatment is available.

For instance, method of dissolving and dispersing and coating silicon oxide to solvent such as alcohol can be adopted.

Moreover, it is desirable that a water-repellent treatment is applied to the upper portion of the filter member 66 of the filter 62.

By composing like this, the water-repellent treatment is applied to the upper portion of the filter member 66 of the filter 62.

As a result, the moisture, which is adhered to the upper portion of the filter member 66 of the filter 62, is flipped by the water-repellent treatment.

Consequently, it is not remained in the upper portion of the filter member 66 (i.e. the mesh portion).

Therefore, it is drawn to the lower part of the filter member 66 by the function of gravity, so that the moisture which is adhered and remained in the filter member 66 can be effectively discharged.

Moreover, where the hydrophilic treatment is applied to the lower part of the filter member 66 of the filter 62, the moisture, which is adhered to the upper portion of the filter member 66 of the filter 62 and flipped by the water-repellent treatment, is drawn by the lower part of the filter member 66 of the filter 62 to which the hydrophilic treatment is applied.

Consequently, the moisture which is adhered and remained in the filter member 66 can be effectively discharged.

In addition, in this Embodiment, the moist fluid, which is consisted of water and the gas, is introduced from the fluid introducing path 58.

As a result, the moist fluid is passed through the filter 62, and the moist fluid is discharged from the fluid discharge path 70.

However, oppositely, of course, it is possible that the moist fluid is introduced from the fluid discharge path 70, and the moist fluid is passed through the filter 62, and the moist fluid is discharged from the fluid introducing path 58.

Embodiment 2

Figure 7:
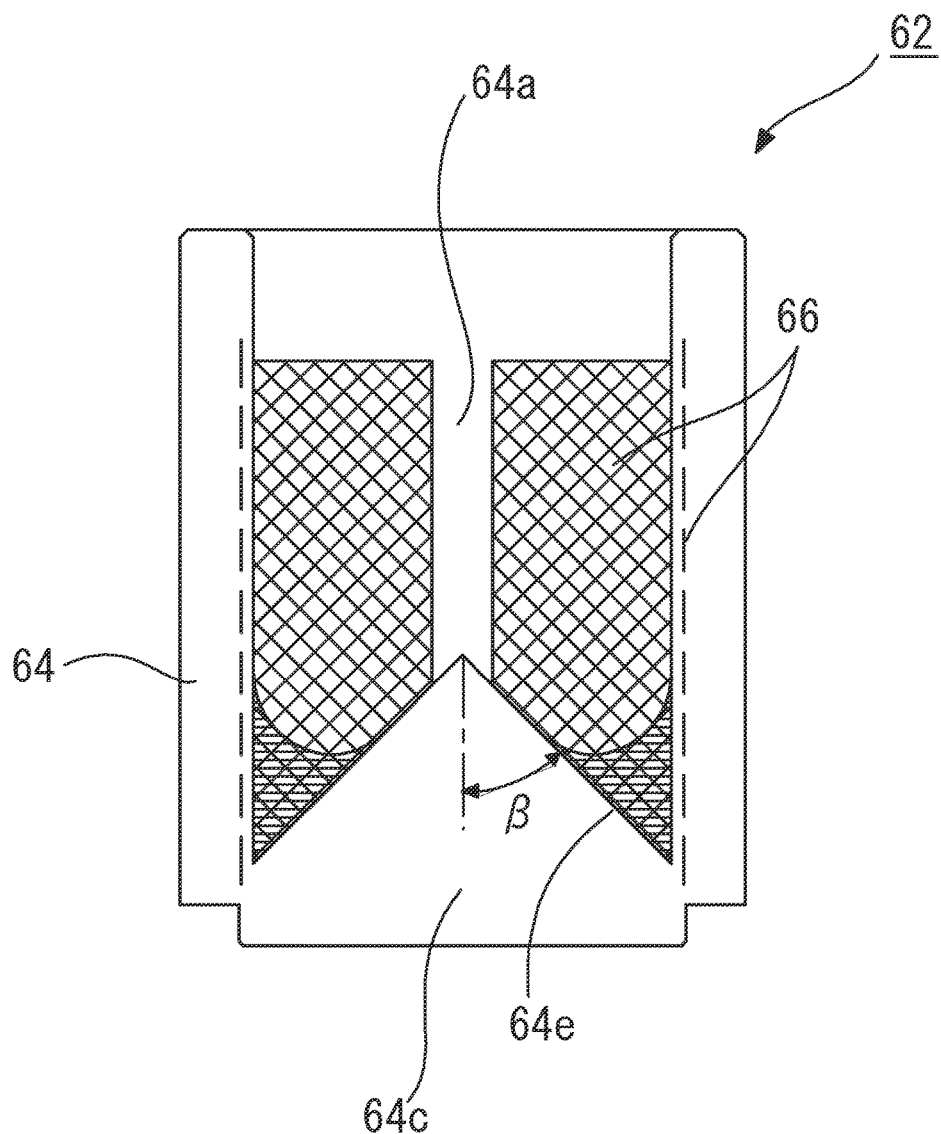
FIG. 7 is a schematic longitudinal sectional view which shows the filter 62 of another Embodiment of the filter device of the invention.

FIG. 7 is a schematic longitudinal sectional view which shows the filter 62 of another Embodiment of the filter device of the invention.

The filter 62 of this Embodiment is basically similar composition of the filter 62 shown in Embodiment 1 shown in FIG. 1-FIG. 5.

Like reference numeral is refer to the same composition member, and the detailed explanation is omitted.

In the filter 62 of this Embodiment, as shown in FIG. 7, the inside edge bottom surface of the filter 62, i.e. the inside edge bottom surface 64*e* of the bottom 64*c* of the filter main body 64, is inclined downward toward outside.

By composing like this, the inside edge bottom surface 64e of the bottom 64c of the filter main body 64 is formed to be inclined downward toward outside.

As a result, by the inclination of the inside edge bottom surface 64e of the bottom 64c of the filter main body 64, it is easy for water to be discharged from the inside edge bottom surface of the filter 62 to the outside.

Moreover, as shown in the portion of double hatching of FIG. 7, water level, which is collected between the inside edge bottom surface 64e of filter 62 and the filter member 66, is risen by surface tension of water and the filter member 66.

In this case, the inside edge bottom surface 64e of the filter 62 is upheaved to form the inclination.

As a result, in addition to advance of water level by the surface tension, according to the upheaval of the inside edge bottom surface 64e of this filter 62, the water level is more risen.

As a result, the water level of the water, which is collected between the inside edge bottom surface 64e of the filter 62 and the filter member 66, is risen.

Consequently, the moisture, which is adhered and remained in the filter member 66, can be easy to be discharged from the filter 62 by gravity.

In addition, by freezing of water which is stayed in the filter 62 (i.e. the inside edge bottom surface of the filter), the filter 62 itself can be prevented from being damaged.

In this case, it is not especially limited as angle of inclination β of the inside edge bottom surface 64e of the bottom 64c of the filter main body 64.

However, if the above-mentioned discharge effect is considered, it is desirable that the angle of inclination β is set within the range of 15° to 60°.

Embodiment 3

Figure 8:
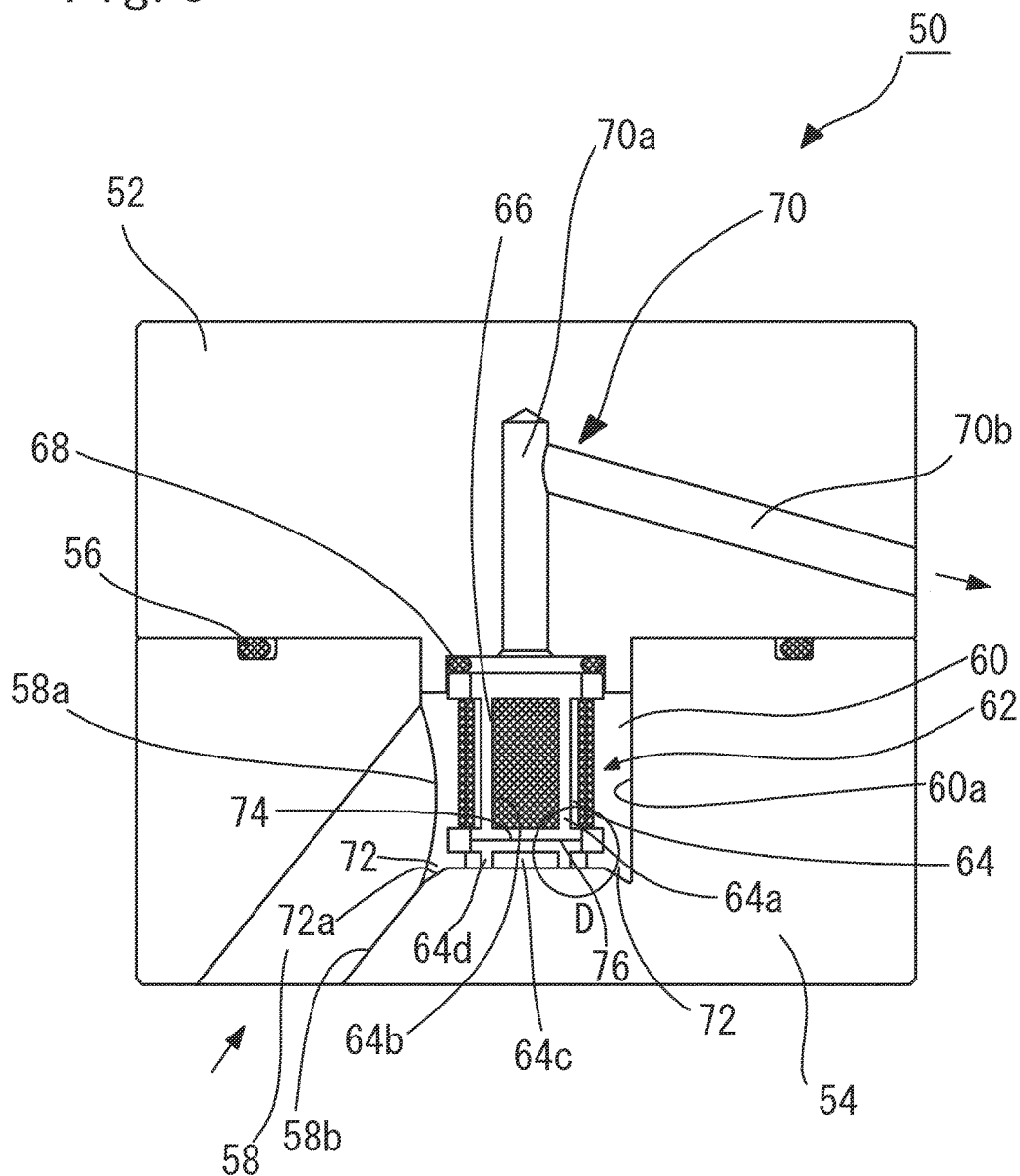
FIG. 8 is a schematic longitudinal sectional view which shows another Embodiment of the filter device of the invention.
Figure 9:
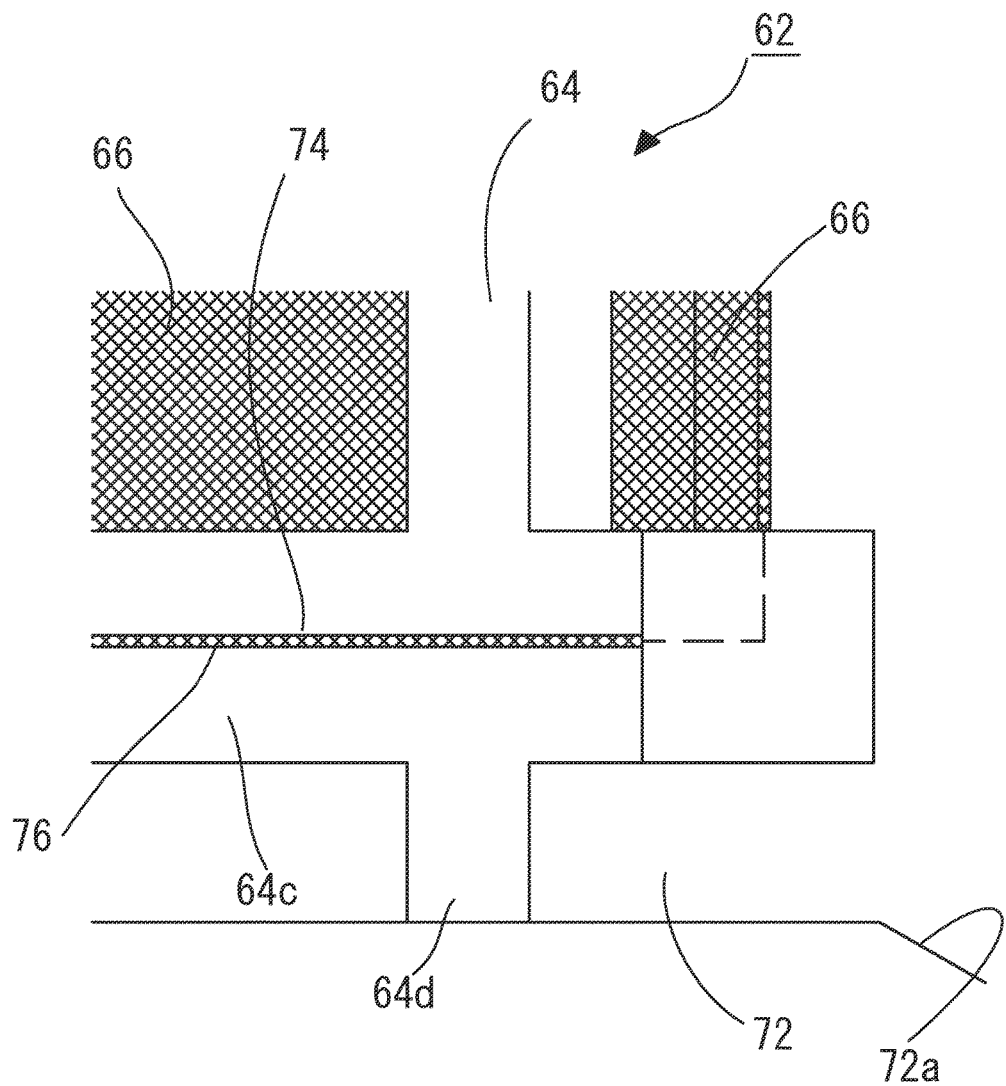
FIG. 9 is a partial enlarged view of D portion of the filter device of FIG. 8.

FIG. 8 is a schematic longitudinal sectional view which shows another Embodiment of the filter device of the invention. FIG. 9 is a partial enlarged view of D portion of the filter device of FIG. 8.

The filter device 50 of this Embodiment is basically similar composition of the filter device 50 shown in Embodiment 1 shown in FIG. 1-FIG. 5.

Like reference numeral is refer to the same composition member, and the detailed explanation is omitted.

In the filter device 50 of this Embodiment, as shown in FIG. 8-FIG. 9, on the bottom 64c of the filter main body 64 of the filter 62, a connecting filter member 74, which is connected to the water pooling portion 72, is formed.

Moreover, on the bottom 64c of the filter main body 64, an extending portion 64d, in which the longitudinal frame member 64a is downwardly extended, is formed.

As a result, the water pooling portion 72 is formed on the bottom 64c of the filter main body 64.

In addition, in FIG. 8-FIG. 9, for convenience about the clarification, the connecting filter member 74 is shown only by the reference numeral.

By composing like this, on the bottom 64c of the filter main body 64 of the filter 62, the connecting filter member 74, which is connected to the water pooling portion 72, is formed.

As a result, when the water level of the water pooling portion 72 is risen, the water, which is stayed in the filter member 66 of the filter 62, is connected to the water pooling portion 72 through the connecting passage 76 formed on the bottom 64c of the filter main body 64 of the filter 62.

Consequently, through the connecting filter member 74 formed on the bottom 64c of the filter main body 64 of the filter 62, the water which is collected in the water pooling portion 72 and the water which is adhered and remained in the filter member 66 are connected.

As a result, the water, which is stayed in the filter member 66 by surface tension and gravity, is discharged to the water pooling portion through the connecting filter member 74 formed on the bottom 64c of the filter main body 64 of the filter 62.

Consequently, when the water collected in the water pooling portion 72 is flowed and fallen in the fluid introducing path 58, the water collected in the water pooling portion 72 is functioned as priming water.

Therefore, the moisture which is adhered and remained in the filter member 66 can be discharged through the connecting filter member 74 formed on the bottom 64c of the filter main body 64 of the filter 62.

In addition, because a bottom surface 72a of the water pooling portion 72 and the fluid introducing path 58 are connected, the water collected in the water pooling portion is discharged to the fluid introducing path 58 at the same time.

Embodiment 4

Figure 10:
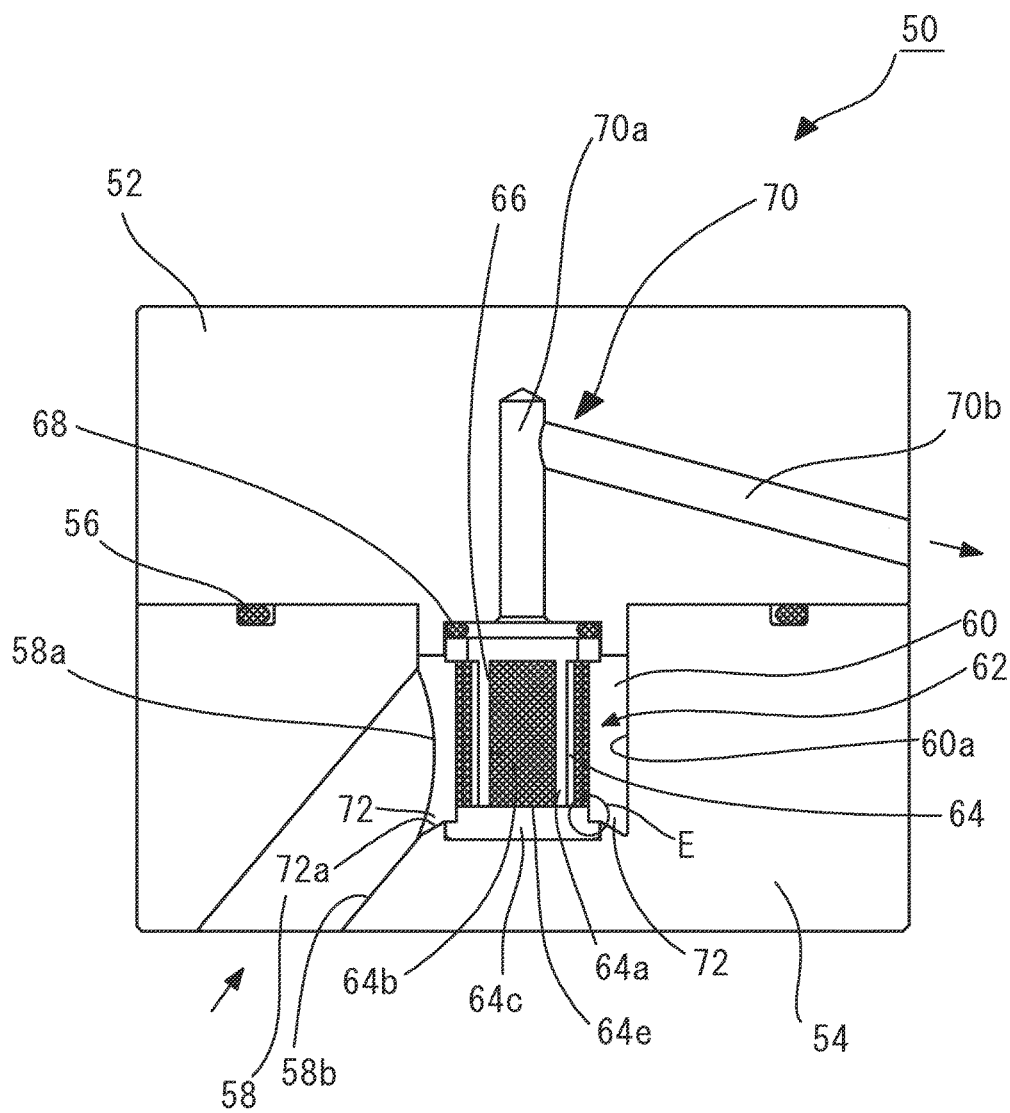
FIG. 10 is a schematic longitudinal sectional view which shows another Embodiment of the filter device of the invention.

FIG. 10 is a schematic longitudinal sectional view which shows another Embodiment of the filter device of the invention.

Figure 11:
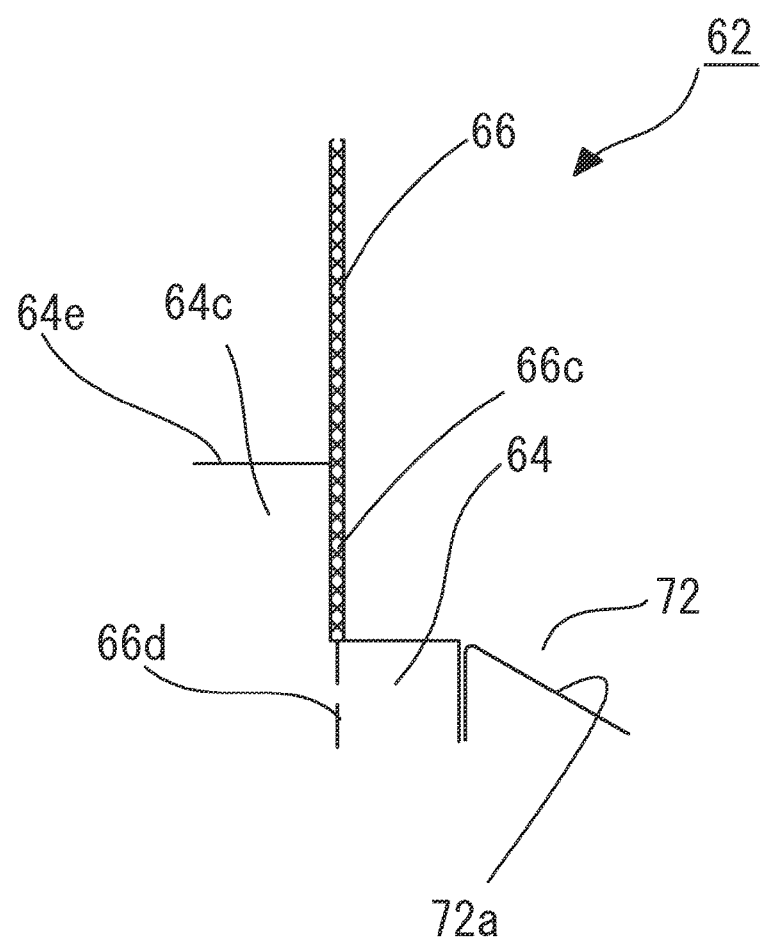
FIG. 11 is a partial enlarged view of E portion of the filter device of FIG. 10.

FIG. 11 is a partial enlarged view of E portion of the filter device of FIG. 10.

The filter device 50 of this Embodiment is basically similar composition of the filter device 50 shown in Embodiment 1 shown in FIG. 1-FIG. 5.

Like reference numeral is refer to the same composition member, and the detailed explanation is omitted.

In the filter device 50 of this Embodiment, as shown in FIG. 10-FIG. 11, to the bottom surface of the inside edge of the filter 62, i.e. to a side surface position that is lower than the inside edge bottom surface 64e of the bottom 64c of the filter main body 64 of the filter 62, an extending portion 66c, in which the filter member 66 of the filter 62 is extended, is provided.

By composing like this, to the bottom surface of the inside edge of the filter 62, i.e. to the side surface position that is lower than the inside edge bottom surface 64e of the bottom 64c of the filter main body 64 of the filter 62, the extending portion 66c, in which the filter member 66 of the filter 62 is extended, is provided.

As a result, even if the water level of the water pooling portion 72 is low, through the extending portion 66c of this filter member 66, the water which is stay in the filter member 66 of the filter 62 and the water which is collected in the water pooling portion 72 are connected.

As a result, the water, which is stayed in the filter member 66 by surface tension and gravity, is discharged to the water pooling portion 72 through the extending portion 66c of this filter member 66.

Consequently, when the water collected in the water pooling portion 72 is flowed and fallen in the fluid introducing path 58, the water collected in the water pooling portion 72 is functioned as priming water, so that the moisture which is adhered and remained in the filter member 66 can be discharged.

In addition, because a bottom surface 72a of the water pooling portion 72 and the fluid introducing path 58 are connected, the water collected in the water pooling portion is discharged to the fluid introducing path 58 at the same time.

Moreover, as shown in FIG. 11, an edge 66*d* of the extending portion 66*c* of this filter member 66 is provided in the state that it is installed into the bottom 64*c* of the filter main body 64 of the filter 62, so that it is prevented from the filter member 66 falling out.

Embodiment 5

Figure 12:
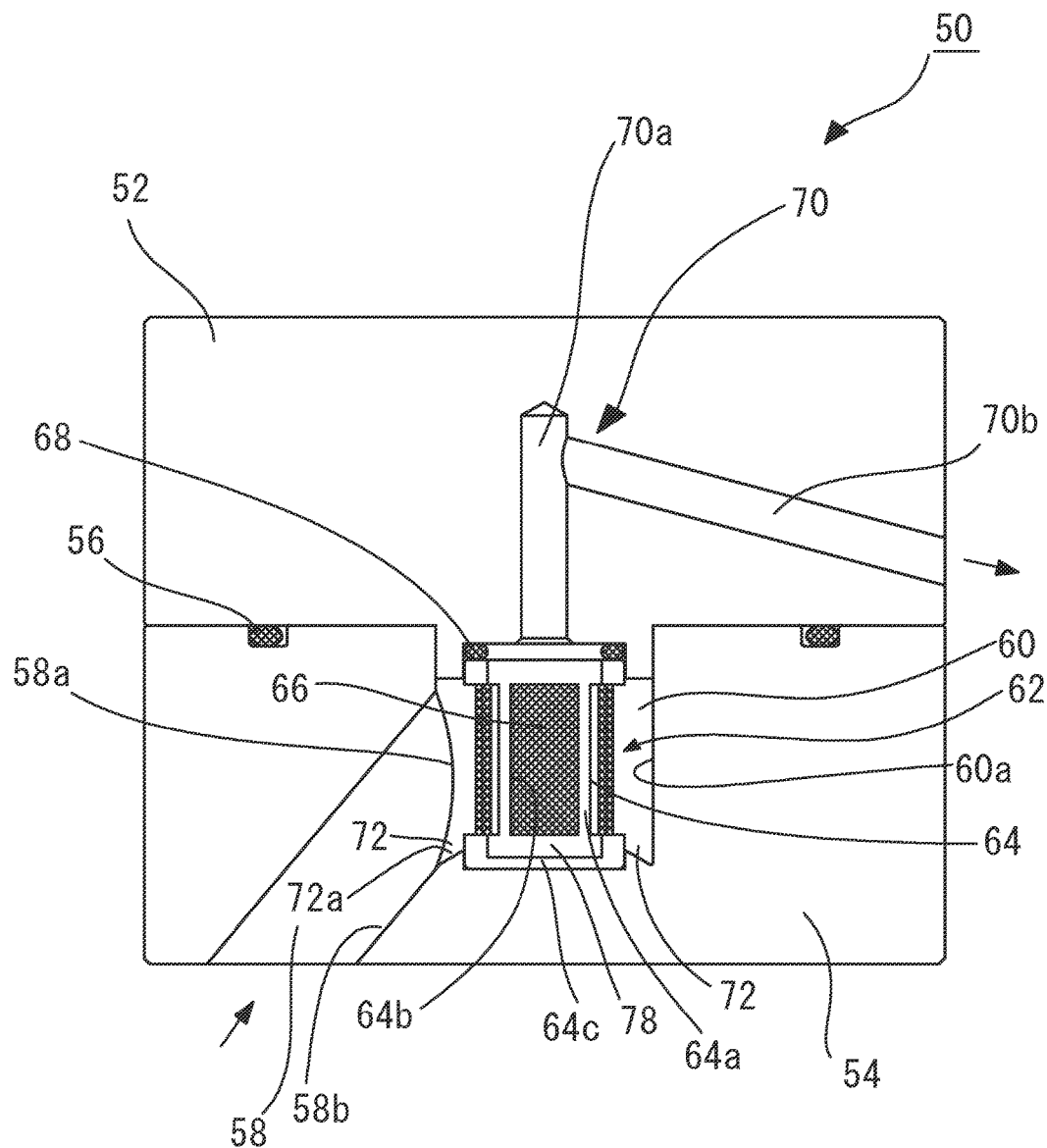
FIG. 12 is a schematic longitudinal sectional view which shows another Embodiment of the filter device of the invention.

FIG. 12 is a schematic longitudinal sectional view which shows another Embodiment of the filter device of the invention. The filter device 50 of this Embodiment is basically similar composition of the filter device 50 shown in Embodiment 1 shown in FIG. 1-FIG. 5.

Like reference numeral is refer to the same composition member, and the detailed explanation is omitted.

In the filter device 50 of this Embodiment, as shown in FIG. 12, another water pooling portion 78 is formed in the filter 62, i.e. is formed on the bottom 64*c* of the filter main body 64.

As a result, the water which is stayed in the filter member 66 of the filter 62 and the water which is collected in the water pooling portion 78 are connected.

Consequently, the water which is overflown from the water pooling portion 78 is discharged to the water pooling portion 72.

Therefore, when the water collected in the water pooling portion 72 is flowed and fallen in the fluid introducing path 58, the water collected in the water pooling portion 78 is functioned as priming water, so that the moisture which is adhered and remained in the filter member 66 can be discharged.

In addition, because a bottom surface 72*a* of the water pooling portion 72 and the fluid introducing path 58 are connected, the water collected in the water pooling portion is discharged to the fluid introducing path 58 at the same time.

In the filter device 50 of FIG. 12, two water pooling portion comprising the water pooling portion 72 and the water pooling portion 78, which is formed in the filter 62, are formed. However, it is also possible to be only the water pooling portion 78 which is formed in the filter 62.

In this case, because the water pooling portion 78 is formed in the filter 62, the water pooling portion need not be formed to the filter housing in which the filter room 60 is formed.

As a result, a special processing of the groove processing etc. to the filter housing can be unnecessary, the time of the processing can be saved, and the cost can be reduced.

Embodiment 6

Figure 13:
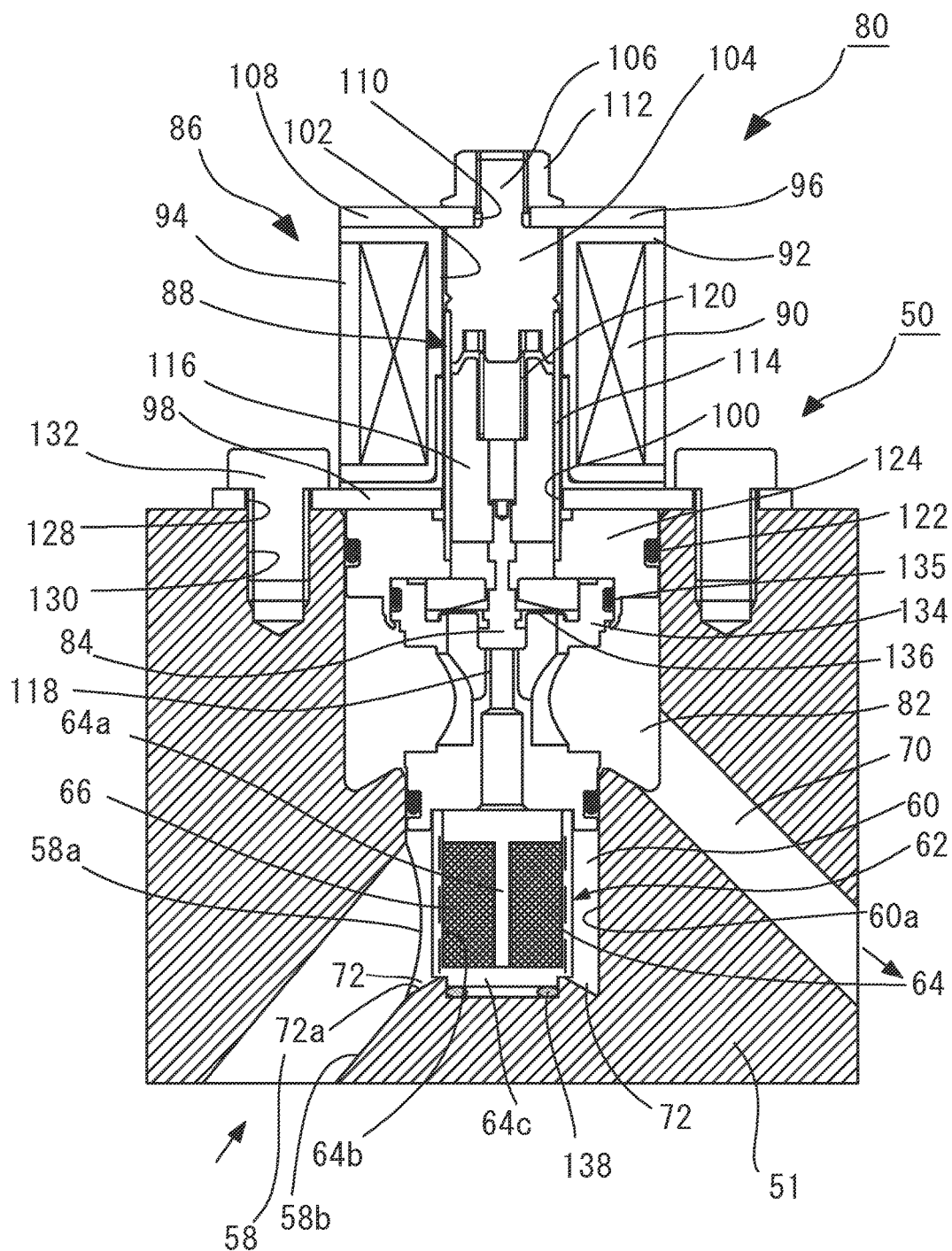
FIG. 13 is a schematic longitudinal sectional view which shows another Embodiment that applies the filter device of the invention to the control valve.

FIG. 13 is a schematic longitudinal sectional view which shows another Embodiment that applies the filter device of the invention to the control valve.

The filter device 50 of this Embodiment is basically similar composition of the filter device 50 shown in Embodiment 1 shown in FIG. 1-FIG. 5.

Like reference numeral is refer to the same composition member, and the detailed explanation is omitted.

In the filter device 50 of this Embodiment, it is included a filter housing 51 in which the upper housing 52 and the lower housing 54 is formed integrally.

Moreover, on the center of the upper portion of this filter housing 51, a valve chest 82 is formed.

In addition, as connected to the valve chest 82, the fluid discharge path 70 is formed such that it is inclined downwardly and outwardly.

Furthermore, to the filter housing 51, as shown in FIG. 13, a solenoid valve type control unit 86, in which a valve element 84 of a control valve 80 is provided, is mounted, so that the control valve 80 is assembled.

Moreover, as shown in FIG. 13, the control unit 86 of this control valve 80 is provided an electromagnetic coil 90 in which a driving portion 88 is passed through.

Moreover, the electromagnetic coil 90 is molded with a molding resin 94, such that a bobbin 92 in which the winding wire is wound and the periphery of the bobbin 92 are surrounded.

In addition, as shown in FIG. 13, the electromagnetic coil 90 is provided in a magnetic frame 96 and is fixed to the driving portion by a magnetic frame 96.

That is, through a driving portion inserting through hole 100, which is formed on a center section of a base plate portion 98 of a magnetic frame 96, and through a driving portion inserting through hole 102 of the bobbin 92, the driving portion 88 is passed.

Moreover, a fastening bolt 106, which is formed on the upper part of attracting member 104 of the driving portion 88, is passed through a bolt inserting through hole 110 formed on the center section of an upper plate portion 108 of the magnetic frame 96 and is screwed by a nut 112.

As a result, the electromagnetic coil 90 is passed through and is fixed to the driving portion 88, so that the control unit 86 of the control valve 80 is composed.

In addition, the driving portion 88 is provided with a plunger casing 114.

Moreover, a plunger 116, in which a valve element 84 is fixed, is provided, such that it is possible to be moved in this plunger casing 114 upwardly and downwardly.

Moreover, between the attracting member 104 and the plunger 116, an energisation spring 120, in which the plunger 116 is urged downwardly, that is, in which a valve element 84 is urged in the direction of a valve seat 118, is disposed.

In addition, on the lower end outer periphery of the plunger casing 114, a sealing frame member 124, in which a sealing member 122 is provided, is fixed.

Moreover, through a fastening hole 128 of the base plate portion 98 of the magnetic frame 96 and through a tightening hole 130 which is formed on the filter housing 51, it is provided on the filter housing 51 by a tightening bolt 132.

In addition, under the sealing frame member 124, a diaphragm fitting part material 134 is fixed in the state that a sealing member 135 is disposed.

Moreover, a diaphragm 136 is provided to the valve element 84 through this diaphragm fitting member 134.

Moreover, as shown in FIG. 13, an elastic member 138 having O-ring shape is disposed between the filter housing 51, in which the filter room 60 is composed, and the filter 62.

In such control valve 80, by energizing to the electromagnetic coil 90, the plunger 116 is moved in the directions of the attracting member 104 against the energisation spring 120.

As a result, the valve element 84, which is connected to the plunger 116, is separated from the valve seat 118, so that the valve port is opened.

Moreover, by intercepting energizing to the electromagnetic coil 90, the plunger 116 is moved in the direction separated from the attracting member 104 by the energisation power of the energisation spring 120.

As a result, the valve element 84, which is connected to the plunger 116, is abutted to the valve seat 118, so that the valve port is closed.

By composing like this, the vibration by operation of the control valve 80, i.e. the vibration etc., which is generated by abutting and separating the valve element 84 to the valve seat 118, is transmitted to the filter 62.

As a result, the filter 62 retained by the elastic member 138 is vibrated, so that the moisture which is adhered and remained in the filter member is easily discharged.

Consequently, the obstruction of the fluid flow of the control valve 80 by freezing the moisture, which is adhered and remained in the filter member 66, can be prevented.

That is, by the vibration by the operation of the control valve 80, an accelerated velocity A is applied to the filter.

Moreover, volume W of minimum water, which is overcome against surface tension F1 of the above-mentioned water and which is flowed and fallen in the fluid introducing path 58 of the tilt angle θ, is obtained by $W = F1/[(G+A) \cdot \cos \theta]$.

That is, according to the adding extent that the vibration by the operation of the control valve 80 is added to the accelerated velocity A against the filter, the discharge of the moisture, which is adhered and remained in the filter member 66, can be attained by the small quantity of water.

In addition, as for the elastic member 138, if elasticity is possessed, well-known elastic member such as plate spring and coiled spring, etc. can be used besides shape of the above-mentioned O-ring.

Moreover, in the filter device 50 of this Embodiment, the Embodiment applied to the solenoid valve is described as the control valve 80.

However, if it is a control valve, it is not especially limited, and is applicable also in other control valves such as electric motor operated valves and three way valves.

Embodiment 7

Figure 14:
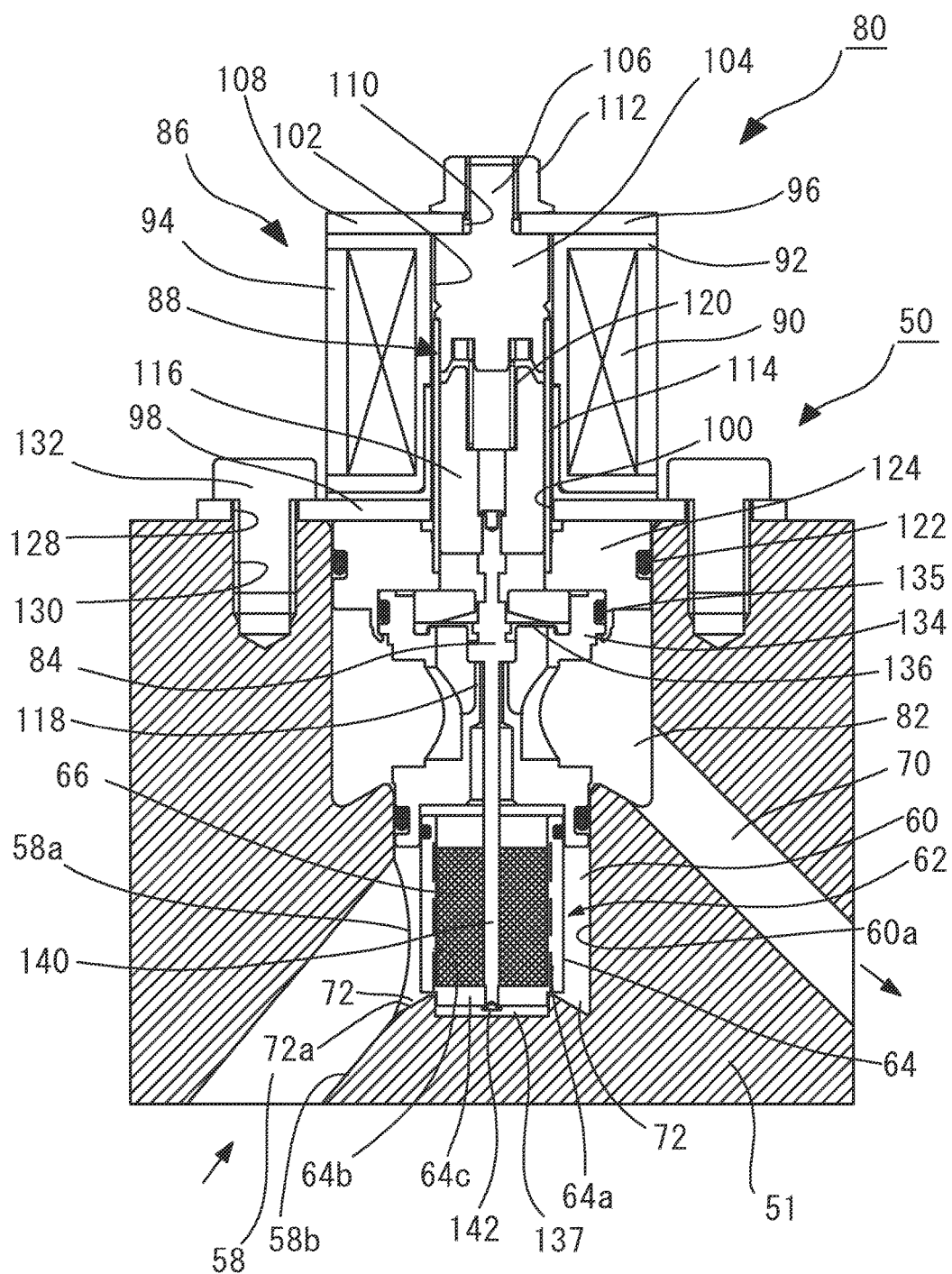
FIG. 14 is a schematic longitudinal sectional view which shows another Embodiment that applies the filter device of the invention to the control valve.

FIG. 14 is a schematic longitudinal sectional view which shows another Embodiment that applies the filter device of the invention to the control valve.

The filter device 50 of this Embodiment is basically similar composition of the filter device 50 shown in Embodiment 1 shown in FIG. 13.

Like reference numeral is refer to the same composition member, and the detailed explanation is omitted.

In the filter device 50 of this Embodiment, as shown in FIG. 14, the valve element 84 of the control valve 80 and the filter 62 are connected.

That is, the valve element 84 is provided with a connecting axial portion 140, which is downwardly extended.

Moreover, the connecting axial portion 140, on the tip portion 142 thereof, is fixed to the bottom 64c of the filter main body 64 of the filter 62 by the rivet processing.

Moreover, between the bottom 64c and the filter housing 51 of the filter main body 64 of the filter 62, a gap 137 for the vertical vibration of the filter 62 is formed.

Moreover, the elastic member 138 of the filter device 50 of Embodiment 6 shown in FIG. 13 is not provided.

By composing like this, the valve element 84 of the control valve 80 and the filter 62 are connected.

As a result, the filter 62 is vibrated directly by operating of the control valve 80, so that the moisture which is adhered and remained in the filter member 66 is more easily discharged.

Embodiment 8

Figure 15:
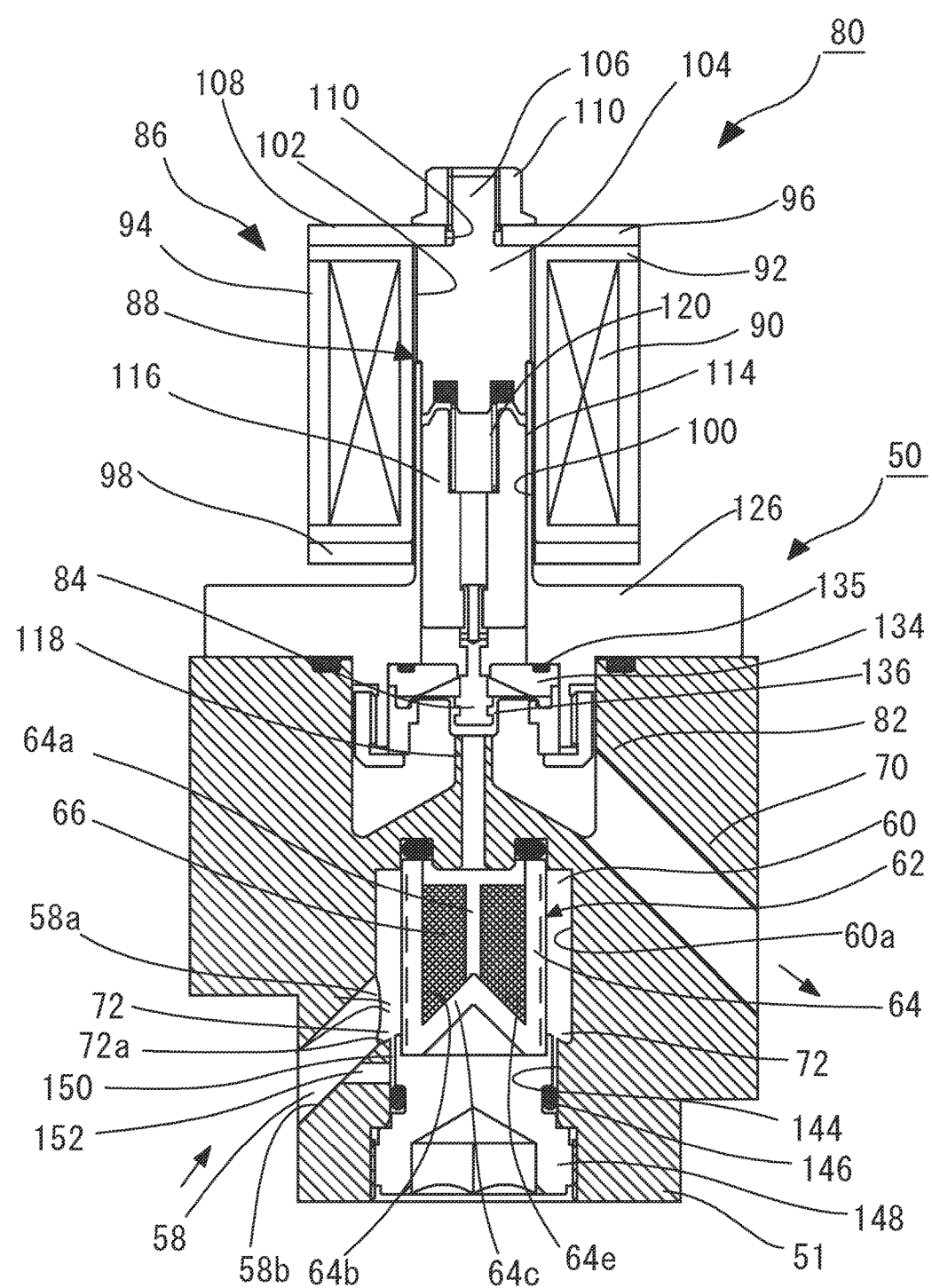
FIG. 15 is a schematic longitudinal sectional view which shows another Embodiment that applies the filter device of the invention to the control valve.

FIG. 15 is a schematic longitudinal sectional view which shows another Embodiment that applies the filter device of the invention to the control valve.

The filter device 50 of this Embodiment is basically similar composition of the filter device 50 shown in Embodiment 6 shown in FIG. 13.

Like reference numeral is refer to the same composition member, and the detailed explanation is omitted.

In the filter device 50 of this Embodiment, as shown in FIG. 15, the elastic member 138 of the filter device 50 of Embodiment 6 shown in FIG. 13 is not provided.

Moreover, as well as the filter device 50 of Embodiment 2 shown in FIG. 7, the inside edge bottom surface of the filter 62, i.e. the inside edge bottom surface 64e of the bottom 64c of the filter main body 64, is inclined downward toward outside.

In addition, so as to the exchange of filters 62 is easy, an opening portion 144 for the filter fixing is formed on the lower end of the filter housing 51.

As a result, a sealing member 146 is disposed to this opening portion 144 for filter fixing, and a filter fixing plug 148 is screwed.

Moreover, as shown in FIG. 15, on a bottom surface 72a of the water pooling portion 72, that is, between the lower end of the filter housing 51 and the filter fixing plug 148, a gap 150 for connecting is formed.

In addition, a connecting hole 152 for discharge, in which this gap 150 for connecting and the fluid introducing path 58 are connected, is formed.

As a result, through the gap 150 for connecting and the connecting hole 152 for discharge, the moisture which is adhered and remained in the filter member 66 is more easily discharged.

That is, in the filter device 50 of this Embodiment, water is collected in not only the water pooling portion 72 but also collected in the gap 150 for connecting.

However, the connecting hole 152 for discharge is provided. As a result, the water, which is flowed and fallen in the fluid introducing path 58, and the water, which is collected in the gap 150 for connecting, are connected through the connecting hole 152 for discharge.

As a result, when the water is flowed and fallen from the fluid introducing path 58, the water, which is flowed and fallen from the fluid introducing path 58, is functioned as priming water, so that the moisture which is adhered and remained in the gap 150 for connecting can be discharged.

As a result, in the filter device 50 of this Embodiment, not only the pump-priming effect (the first time) generated by the water, which is adhered to the water pooling portion 72 and the filter member 66, is generated, but also the pump-priming effect (the second times) generated by the water, which is flowed and fallen from the fluid introducing path 58 and the water, which is collected in gap 150 for connecting, is generated.

Consequently, in total, two times of the pump-priming effects is generated.

Thus, because in total, two times of the pump-priming effects is generated, not only the water which is adhered to filter member 66 but also the water of the water pooling portion 72 can be more certainly removed.

As a preferable of the invention is described above, the embodiment, in which the filter provision 50 of the present invention is disposed on the upstream side of the purge valve 44, is described.

However, the invention is not limited to this embodiment and for instance, though not shown in the drawing, a similar effect is achieved even if it is disposed on the upstream side of the water discharging valve 46 and on the upstream side of the air pressure adjustment valve 32.

Although a preferable of the invention is described above, the invention is not limited to this embodiment.

For instance, the filter device 50 of the invention is described about the Embodiment applied to the fuel cell system 10.

However, if it is a moist fluid passage of the system, in which moisture is included in the fluid, the filter device 50 of the invention can be disposed on any system not to be limited to the fuel cell system 10.

Therefore, various changes are possible in the scope in which it does not deviate from the object of the invention.

INDUSTRIAL APPLICABILITY

The invention relates to a filter device disposed in the moist fluid passage of the fuel cell system.

In particular, the invention relates to the filter device which is disposed in series with the upstream side of the purge valve that opens and shuts the passage of the moist fluid, and the invention relates to a suitable filter device as a filter to remove the foreign substance in the fluid.

The invention also relates to a control valve comprising the filter device and a fuel cell system.

EXPLANATION OF LETTERS OR NUMERALS

10
Fuel cell system
12
Fuel-cell stacks
14
Hydrogen tank
16
Anode
18
Compressor
20
Cathode
22
Hydrogen pressure adjustment valve
24
Hydrogen supply passage
26
Hydrogen circulation pump
28
Hydrogen circulation passage
28*a*
Divergence path
30
Air supply passage
32
Air pressure adjustment valve
34
Radiator
36
Cooling water pump
38, 40
42
Discharge path
44
Purge valve
46
Water discharging valve
48
Filter device
50
Filter housing
52
Upper housing
54
Lower housing
56
Sealing member
58
Fluid introducing path
58*a*
Upper end
58*b*
Lower surface
60
Filter room
60*a*
Sidewall
62
Filter
64
Filter main body
64*a*
Longitudinal frame member
64*b*
Opening portion
64*c*
Bottom
64*d*
Extending portion
64*e*
Inside edge bottom surface
66
Filter member
66*a*
Top surface
66*b*
Lower end surface
66*c*
Extending portion
66*d*
Edge
68
Sealing member
70
Fluid discharge path
70*a*
First fluid discharge path
70*b*
Second fluid discharge path
72
Water pooling portion
72*a*
Bottom surface
74
Connecting filter member
76
Connecting passage
78
Water pooling portion
80
82
Control valve 84 Valve chest
Valve element
86 Control unit
88 Driving portion
90 Electromagnetic coil
92 Bobbin
94 Molding resin
96 Magnetic frame
98 Base plate portion
100 Driving portion inserting through hole
102 Driving portion inserting through hole
104 Attracting member
106 Fastening bolt
108 Upper plate portion
110 Bolt inserting through hole
112 Nut
114 Plunger casing
116 Plunger
118 Valve seat
120 Energisation spring
122 Sealing member
124 Sealing frame member
126 Cover member
128 Fastening hole
130 Tightening hole
132 Bolt
134 Diaphragm fitting member
135 Sealing member
136 Diaphragm
137 Gap
138 Elastic member
140 Connecting axial portion
142 Tip portion
144 Opening portion for filter fixing
146 Sealing member
148 Filter fixing plug
150 Gap for connecting
152 Connecting hole for discharge
200 Fuel cell system
202 Fuel-cell stacks
204 Hydrogen tank
206 Anode
208 Compressor
210 Cathode
212 Hydrogen pressure adjustment valve
214 Hydrogen supply passage
216 Hydrogen circulation pump
218 Hydrogen circulation passage
220 Air supply passage
222 Air pressure adjustment valve
224 Radiator
226 Cooling water pump
228, 230 Cooling fluid circulation path
232 Discharge path
234 Purge valve

DOCUMENT TITLE

Drawing

Figure 16:
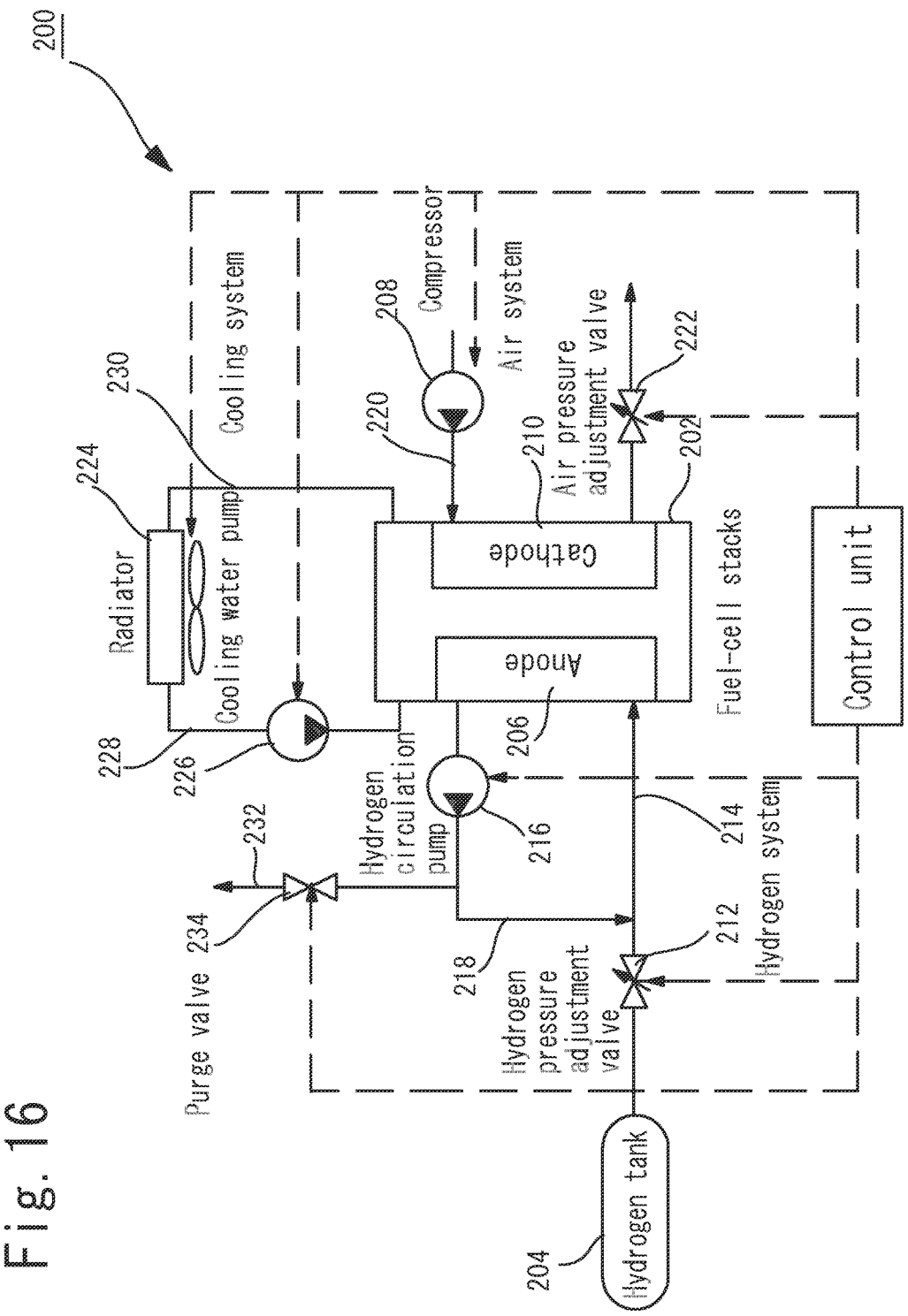
FIG. 16 is a schematic view of a conventional fuel cell system.

[FIG. 1]
[FIG. 2]
[FIG. 3]
[FIG. 4]
[FIG. 5]
[FIG. 6]
[FIG. 7]
[FIG. 8]
[FIG. 9]
[FIG. 10]
[FIG. 11]
[FIG. 12]
[FIG. 13]
[FIG. 14]
[FIG. 15]
[FIG. 16]

The invention claimed is:

1. A filter device disposed in a moist fluid passage of a system, the filter device comprising:
   a fluid introducing path via which a fluid that flows in the moist fluid passage is introduced into a filter room from an area below the filter room;
   a filter including a filter member permeating the fluid introduced from the fluid introducing path into the filter room and removing foreign matter in the introduced fluid, wherein the filter is located in the filter room;
   at least one of:
      a first water pooling portion, which is disposed at a first position lower than the filter member on a sidewall side of a bottom of the filter room and on a periphery of the filter, or
      a second water pooling portion, which is disposed at a second position lower than the filter member of the filter; and
   a fluid discharge path via which a fluid that passed the filter is discharged,
   wherein a gap size between the filter and a sidewall of the filter room is configured to allow at least one of a first water level of first water, which is collected from the fluid and is stored in the first water pooling portion, or a second water level of second water, which is collected from the fluid and is stored in the second water pooling portion, to reach a level higher than a lower end surface of the filter member, the lower end surface of the filter member is located opposite to an upper end of the filter, and the upper end of the filter is connected to the fluid discharge path.

2. The filter device as defined in claim 1, wherein a lower surface of the fluid introducing path is located at a position lower than the at least one of a bottom surface of the first water pooling portion or a bottom surface of the second water pooling portion.

3. The filter device as defined in claim 1, wherein a surface of an inside bottom of the filter is inclined downward to outside of the filter.

4. The filter device as defined in claim 1, further comprising: a connecting filter member, which is connected to the at least one of the first water pooling portion or the second water pooling portion, located on a bottom of the filter.

5. The filter device as defined in claim 1, wherein
   a bottom surface of the first water pooling portion is formed to be inclined downward to an outside of the first water pooling portion.

6. The filter device as defined in claim 1, wherein the filter member of the filter is extended to a side surface position, which is lower than a surface of inside bottom of the filter.

7. The filter device as defined in claim 1, wherein the at least one of the first water pooling portion or the second water pooling portion is formed in the filter.

8. The filter device as defined in claim 1, wherein a hydrophilic treatment is applied to the at least one of the first water pooling portion or the second water pooling portion.

9. The filter device as defined in claim 1, wherein a hydrophilic treatment is applied to a lower part of the filter member of the filter.

10. The filter device as defined in claim 1, wherein a water-repellent treatment is applied to an upper part of the filter member of the filter.

11. A control valve, comprising a filter device disposed in a moist fluid passage of a system,
    wherein the filter device comprises:
       a fluid introducing path via which fluid that flows in the moist fluid passage is introduced into a filter room from an area below the filter room,
       a filter including a filter member permeating the fluid introduced from the fluid introducing path into the filter room and removing foreign matter in the introduced fluid, wherein the filter is located in the filter room,
       at least one of:
          a first water pooling portion, which is disposed at a first position lower than the filter member on a sidewall side of a bottom of the filter room and on a periphery of the filter, or
          a second water pooling portion, which is disposed at a second position lower than the filter member of the filter, and
       a fluid discharge path via which a fluid that passed the filter is discharged, and
    wherein a gap size between the filter and a sidewall of the filter room is configured to allow at least one of a first water level of first water, which is collected from the fluid and is stored in the first water pooling portion, or a second water level of second water, which is collected from the fluid and is stored in the second water pooling portion, to reach a level higher than a lower end surface of the filter member, the lower end surface of the filter member is located opposite to an upper end of the filter, and the upper end of the filter is connected to the fluid discharge path.

12. The control valve as defined in claim 11, wherein an elastic member is disposed between a filter housing comprising the filter room and the filter.

13. The control valve as defined in claim 11, wherein a valve element of the control valve and the filter are connected.

14. A fuel cell system, comprising a filter device disposed on a discharge passage of a moist fluid passage of the fuel cell system,
    wherein the filter device comprises:
       a fluid introducing path via which a fluid that flows in the moist fluid passage is introduced into a filter room from an area below the filter room,
       a filter including a filter member permeating the fluid introduced from the fluid introducing path into the filter room and removing foreign matter in the introduced fluid, wherein the filter is located in the filter room,
       at least one of:
          a first water pooling portion, which is disposed at a first position lower than the filter member on a sidewall side of a bottom of the filter room and on a periphery of the filter, or
          a second water pooling portion, which is disposed at a second position lower than the filter member of the filter, and
       a fluid discharge path via which a fluid that passed the filter is discharged,
    wherein a gap size between the filter and a sidewall of the filter room is configured to allow at least one of a first water level of first water, which is collected from the fluid and is stored in the first water pooling portion, or a second water level of second water, which is collected from the fluid and is stored in the second water pooling portion, to reach a level higher than a lower end surface of the filter member, the lower end surface of the filter member is located opposite to an upper end of the filter, and the upper end of the filter is connected to the fluid discharge path.

15. A fuel cell system, comprising a control valve disposed in a discharge passage of a moist fluid passage of the fuel cell system,
wherein the control valve comprises a filter device,
wherein the filter device comprises:
a fluid introducing path via which fluid that flows in the moist fluid passage is introduced into a filter room from an area below the filter room,
a filter including a filter member permeating the fluid introduced from the fluid introducing path into the filter room and removing foreign matter in the fluid, wherein the filter is located in the filter room,
at least one of:
a first water pooling portion, which is disposed at a first position lower than the filter member on a sidewall side of a bottom of the filter room and on a periphery of the filter, or
a second water pooling portion, which is disposed at a second position lower than the filter member of the filter, and
a fluid discharge path via which a fluid that passed the filter is discharged,
wherein a gap size between the filter and a sidewall of the filter room is configured to allow at least one of a first water level of first water, which is collected from the fluid and is stored in the first water pooling portion, or a second water level of second water, which is collected from the fluid and is stored in the second water pooling portion, to reach a level higher than a lower end surface of the filter member, the lower end surface of the filter member is located opposite to an upper end of the filter, and the upper end of the filter is connected to the fluid discharge path.

16. The filter device as defined in claim 1, wherein a bottom surface of the second water pooling portion is formed to be inclined downward to an outside of the second water pooling portion.

17. The control valve as defined in claim 11, wherein a bottom surface of the first water pooling portion is formed to be inclined downward to an outside of the first water pooling portion.

18. The control valve as defined in claim 11, wherein a bottom surface of the second water pooling portion is formed to be inclined downward to an outside of the second water pooling portion.

19. The filter device as defined in claim 1, wherein $W1+W2 \geq F1/(G \cos \theta)$, wherein W1 is a volume of water stored in the filter, W2 is a volume of water stored between the filter and the sidewall side of the bottom of the filter room, F1 is a water surface tension, G is acceleration of gravity, and θ is an inclination angle of the fluid introducing path.

20. The control valve as defined in claim 11, wherein $W1+W2 \geq F1/(G \cos \theta)$, wherein W1 is a volume of water stored in the filter, W2 is a volume of water stored between the filter and the sidewall side of the bottom of the filter room, F1 is a water surface tension, G is acceleration of gravity, and θ is an inclination angle of the fluid introducing path.

* * * * *